United States Patent
Rugeland et al.

(10) Patent No.: US 11,968,524 B2
(45) Date of Patent: *Apr. 23, 2024

(54) CONFIGURING RADIO RESOURCES

(71) Applicant: Telefonaktiebolaget LM Ericsson (publ), Stockholm (SE)

(72) Inventors: Patrik Rugeland, Stockholm (SE); Gunnar Mildh, Sollentuna (SE); Håkan Palm, Växjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

This patent is subject to a terminal disclaimer.

(21) Appl. No.: 17/688,692

(22) Filed: Mar. 7, 2022

(65) Prior Publication Data

US 2022/0191690 A1    Jun. 16, 2022

Related U.S. Application Data

(63) Continuation of application No. 16/340,466, filed as application No. PCT/EP2019/053321 on Feb. 11, 2019, now Pat. No. 11,272,359.

(Continued)

(51) Int. Cl.
*H04W 12/033* (2021.01)
*H04W 12/037* (2021.01)
*H04W 72/04* (2023.01)

(52) U.S. Cl.
CPC ....... *H04W 12/033* (2021.01); *H04W 12/037* (2021.01); *H04W 72/04* (2013.01)

(58) Field of Classification Search
None
See application file for complete search history.

(56) References Cited

U.S. PATENT DOCUMENTS 8,849,245 B2    9/2014    Takahashi et al.
9,055,105 B2    6/2015    Leppanen et al.
(Continued)

FOREIGN PATENT DOCUMENTS

CN         105659690 A      6/2016
KR       20180030034 A      3/2018
(Continued)

OTHER PUBLICATIONS

Ericsson, "Ciphering and integrity protection configuration per DRB", 3GPP TSG-RAN WG2 #101Bis, Sanya, P.R. of China, Apr. 16, 2018, pp. 1-9, R2-1804799, 3GPP.

(Continued)

*Primary Examiner* — Derrick W Ferris
*Assistant Examiner* — Keith Follansbee
(74) *Attorney, Agent, or Firm* — COATS & BENNETT, PLLC

(57) ABSTRACT

A method, performed by a wireless device, is disclosed. The method is for managing radio resources in the wireless device and comprises receiving a message configuring a radio bearer for use by the wireless device, checking the message for a ciphering configuration setting enabling or disabling ciphering for the radio bearer, and performing at least one of enabling or disabling ciphering for the radio bearer in accordance with the received message.

Also disclosed are a method performed by a base station for configuring radio resources for use by a wireless device, a wireless device, a user equipment and a base station.

16 Claims, 16 Drawing Sheets

Related U.S. Application Data

(60) Provisional application No. 62/652,963, filed on Apr. 5, 2018.

(56) References Cited

U.S. PATENT DOCUMENTS

| | | | |
|---|---|---|---|
| 10,764,870 | B2 | 9/2020 | Yi et al. |
| 2012/0023355 | A1 | 1/2012 | Song et al. |
| 2014/0321371 | A1 | 10/2014 | Anderson et al. |
| 2015/0163678 | A1 | 6/2015 | Zhang et al. |
| 2015/0319744 | A1 | 11/2015 | Jung et al. |
| 2016/0073404 | A1 | 3/2016 | Vutukuri et al. |
| 2016/0234847 | A1 | 8/2016 | Zhang et al. |
| 2016/0234877 | A1 | 8/2016 | Bangolae et al. |
| 2016/0366707 | A1 | 12/2016 | Sirotkin et al. |
| 2018/0062847 | A1 | 3/2018 | Mildh et al. |
| 2018/0332469 | A1 | 11/2018 | Lee et al. |
| 2018/0352482 | A1 | 12/2018 | Gage et al. |
| 2019/0253881 | A1 | 8/2019 | Gage |
| 2020/0245136 | A1* | 7/2020 | Tang .................. H04W 12/06 |

FOREIGN PATENT DOCUMENTS

| | | |
|---|---|---|
| RU | 2432571 C1 | 10/2011 |
| RU | 2525547 C2 | 8/2014 |
| RU | 2550562 C2 | 5/2015 |
| WO | 2008086532 A1 | 7/2008 |
| WO | 2013169789 A1 | 11/2013 |
| WO | 2016186697 A1 | 11/2016 |

OTHER PUBLICATIONS

3rd Generation Partnership Project, "3rd Generation Partnership Project; Technical Specification Group Services and System Aspects; 3GPP System Architecture Evolution (SAE); Security architecture (Release 15)", Technical Specification, 3GPP TS 33.401 V15.2.0, pp. 1-163, Jan. 1, 2018, 3GPP, France.

3rd Generation Partnership Project, "3rd Generation Partnership Project; Technical Specification Group Services and System Aspects; Security architecture and procedures for 5G system (Release 15)", Technical Specification, 3GPP TS 33.501 V1.0.0, Mar. 1, 2018, pp. 1-128, 3GPP, France.

SA3, "Presentation of Specification/Report to TSG: Presentation of Specification/Report to TSG:TS33.501, Version 1.0.0", 3GPP TSG-SA Meeting #79, Chennai, India, Mar. 19, 2018, p. 1, Tdoc SP-180056, 3GPP.

3rd Generation Partnership Project, "3rd Generation Partnership Project; Technical Specification Group Radio Access Network; NR; Radio Resource Control (RRC) protocol specification (Release 15)", Technical Specification, 3GPP TS 38.331 V15.1.0, Mar. 1, 2018, pp. 1-268, 3GPP, France.

Huawei, et al., Procedures for enabling security per bearer, 3GPP TSG-RAN WG2 #101, Athens, Greece, Feb. 26-Mar. 2, 2018, R2-1802799 (revision of R2-1800475).

Huawei et al., Procedures for enabling security per bearer, 3GPP TSG-RAN WG2 Ad Hoc, Vancouver, Canada, Jan. 22-26, 2018, R2-1800475 (revision of RS-1712538).

3rd Generation Partnership Project, 3rd Generation Partnership Project; Technical Specification Group Services and System Aspects; Security architecture and procedures for 5G system; (Release 15), Technical Specification, 3GPP TS 33.501, V15.0.0 (Mar. 2018), pp. 1-128.

\* cited by examiner

CONFIGURING RADIO RESOURCES

RELATED APPLICATIONS

The present application is a continuation of U.S. patent application Ser. No. 16/340,466, which was filed on Apr. 9, 2019, which is a national stage application of PCT/EP2019/053321, which was filed Feb. 11, 2019, and claims benefit of U.S. Provisional Application 62/652,963, which was filed Apr. 5, 2018, the disclosures of each of which are incorporated herein by reference in their entirety.

TECHNICAL FIELD

The present disclosure relates to a method performed by a wireless device for managing radio resources in the wireless device. The present disclosure also relates to a method performed by a base station for configuring radio resources for use by a wireless device. The present disclosure also relates to a wireless device, a user equipment, and a base station.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In LTE, the security solution involves ciphering and integrity protection. For both the ciphering and the integrity protection, there are specified for LTE (Long Term Evolution) four different algorithms; EEA0-3, and EIA0-3, as defined in 3rd Generation Partnership Project (3GPP) Technical Standard (TS) 33.401 (v.15.2.0). The ciphering is designed to prevent an attacker from eavesdropping on the communication, whereas the integrity protection is intended to verify the identity of both the UE and the network. To ensure security, all radio bearers except SRB0 are ciphered, but only the Signalling Radio Bearers (SRBs) (except SRB0) are integrity protected. The reason the Data Radio Bearers (DRBs) were not integrity protected is that the integrity protection adds an overhead to the communication in the form of a Message Authentication Code for Integrity (MAC-I) to each Packet Data Convergence Protocol (PDCP) packet with integrity protection enabled.

The ciphering procedure is described in section B.1 of 3GPP TS 33.401 (v15.2.0). The input parameters to the ciphering algorithm are a 128-bit cipher key named KEY, a 32-bit COUNT, a 5-bit bearer identity BEARER, the 1-bit direction of the transmission i.e., DIRECTION, and the length of the keystream required i.e., LENGTH. The DIRECTION bit shall be 0 for uplink and 1 for downlink.

FIG. 1 illustrates the use of the ciphering algorithm EEA to encrypt plaintext by applying a keystream using a bit per bit binary addition of the plaintext and the keystream. The plaintext may be recovered by generating the same keystream using the same input parameters and applying a bit per bit binary addition with the ciphertext. Based on the input parameters, the algorithm generates the output keystream block KEYSTREAM which is used to encrypt the input plaintext block PLAINTEXT to produce the output ciphertext block CIPHERTEXT. The input parameter LENGTH shall affect only the length of the KEYSTREAM BLOCK, not the actual bits in it.

The integrity protection procedures are described in section C.1 of 3GPP TS 33.401 (v15.2.0). The input parameters to the integrity algorithm are a 128-bit integrity key named KEY, a 32-bit COUNT, a 5-bit bearer identity called BEARER, the 1-bit direction of the transmission i.e., DIRECTION, and the message itself i.e., MESSAGE. The DIRECTION bit shall be 0 for uplink and 1 for downlink. The bit length of the MESSAGE is LENGTH.

FIG. 2 illustrates the use of the integrity algorithm EIA to authenticate the integrity of messages, including the derivation of MAC-I/NAS-MAC (or XMAC-I/XNAS-MAC). Based on these input parameters the sender computes a 32-bit message authentication code (MAC-I/NAS-MAC) using the integrity algorithm EIA. The message authentication code is then appended to the message when sent. For integrity protection algorithms other than EIA0 the receiver computes the expected message authentication code (XMAC-I/XNAS-MAC) on the message received in the same way as the sender computed its message authentication code on the message sent and verifies the data integrity of the message by comparing it to the received message authentication code, i.e. MAC-I/NAS-MAC.

For New Radio (NR) or 5G (5th Generation), the initial release will have the same ciphering and integrity protection algorithms, but defined using NR code points, as NEA0-3 and NIA0-3.

It has been agreed that for NR, ciphering and integrity protection should be configurable for at least each PDU (Protocol Data Unit) session, and possibly each DRB.

There currently exist certain challenge(s). There is currently no specified method to configure ciphering and integrity protection per PDU session or per DRB. As discussed above, in LTE, ciphering is always enabled for all SRBs (except SRB0) and all DRBs, but integrity protection is only enabled for all SRBs (except SRB0).

Certain aspects of the present disclosure and their embodiments may provide solutions to these or other challenges. It is an object of the present disclosure to provide methods, a wireless device and a base station which at least partially address one or more of the challenges discussed above.

SUMMARY

Aspects of the present disclosure specify how to configure each radio bearer with enabled or disabled ciphering. According to examples of the present disclosure, such configuration is achieved with minimal signalling overhead.

In one example of the present disclosure, a UE is configured with default settings for ciphering for radio bearers, and reconfiguration of the radio bearers only includes reconfiguration of the ciphering if this setting needs to be changed. Thus, according to some aspects of the present disclosure, ciphering protection is only configured if it uses a non-default setting or if existing settings are to be changed during reconfiguration. Otherwise, no signalling overhead is added.

In another example of the present disclosure, the ciphering configuration is included for every configuration and reconfiguration of the radio bearer.

In another example of the present disclosure, the ciphering configuration is included once per PDU-session (instead of once per radio bearer).

There are, proposed herein, various embodiments which address one or more of the issues disclosed herein. Certain embodiments may provide one or more of the following technical advantages. According to some examples of the present disclosure, a UE can be configured and reconfigured with ciphering for each radio bearer individually with minimal signalling overhead. The present disclosure also introduces a mechanism to use default values for the most common configuration, which significantly reduces the size of a message setting up or modifying the radio bearer. Benefits provided by examples of the present disclosure may include the increased likelihood that the message is received error free, leading to less risk of dropped connections and so to better end user performance, faster signalling reducing delays experienced by the end users, and improved energy efficiency due to smaller transmissions with less overhead.

According to a first aspect of the present disclosure, there is provided a method performed by a wireless device for managing radio resources in the wireless device. The method comprises receiving a message configuring a radio bearer for use by the wireless device, checking the message for a ciphering configuration setting enabling or disabling ciphering for the radio bearer, and performing at least one of enabling or disabling ciphering for the radio bearer in accordance with the received message.

According to examples of the present disclosure, performing at least one of enabling or disabling ciphering for the radio bearer in accordance with the received message may comprises: if the message includes a ciphering configuration setting for the radio bearer, performing at least one of enabling or disabling ciphering for the radio bearer in accordance with the ciphering configuration setting included in the message, and if the message does not include a ciphering configuration setting for the radio bearer, performing at least one of enabling or disabling ciphering for the radio bearer in accordance with a reference ciphering configuration setting for the radio bearer.

According to examples of the present disclosure, if the radio bearer configured by the message is not part of the current configuration for the wireless device, the reference ciphering configuration setting may comprise a default ciphering configuration setting, and if the radio bearer configured by the message is part of the current configuration for the wireless device, the reference ciphering configuration setting may comprise the existing ciphering configuration setting for the radio bearer.

According to examples of the present disclosure, the message may comprise a Radio Resource Control Connection Reconfiguration message (for example in LTE) or a Radio Resource Control Reconfiguration message for example in (NR).

According to examples of the present disclosure, checking the message for a ciphering configuration setting for the radio bearer may comprise checking an Information Element inside a RadioBearerConfig Information Element.

According to examples of the present disclosure, the message may configure a plurality of radio bearers for the wireless device, and checking the message for a ciphering configuration setting for the radio bearer may comprise checking an Information Element specific to the radio bearer.

According to examples of the present disclosure, the Information Element specific to the radio bearer may comprise pdcp-Config.

According to examples of the present disclosure, the Information Element specific to the radio bearer may comprise, for a data radio bearer, the DRB-ToAddMod Information Element, and for a signalling radio bearer, the SRB-ToAddMod Information Element.

According to examples of the present disclosure, checking the message for a ciphering configuration setting for the radio bearer may comprise checking after the extension marker of the Information Element.

According to examples of the present disclosure, the ciphering configuration setting may comprise an Optional parameter, the optional parameter comprising a single bit indicating if ciphering should be enabled or disabled.

According to examples of the present disclosure, including a ciphering configuration setting for the radio bearer in the message may comprise including the ciphering configuration setting before the extension marker of the Information Element, and the ciphering configuration setting may comprise an Optional Enumerated (enabled)—Need R parameter.

According to examples of the present disclosure, the message may configure a plurality of radio bearers for the wireless device, and checking the message for a ciphering configuration setting for the radio bearer may comprise checking an Information Element applicable to all radio bearers configured by the message.

According to examples of the present disclosure, the Information Element applicable to all radio bearers configured by the message may comprise the SecurityConfig Information Element.

According to examples of the present disclosure, checking the message for a ciphering configuration setting for the radio bearer may comprise checking for a list of ciphering configuration settings for radio bearers configured by the message.

According to examples of the present disclosure, the list may specify ciphering configuration settings per radio bearer identity.

According to examples of the present disclosure, the list may comprise only ciphering configuration settings for those bearers for which the ciphering configuration setting differs from the reference ciphering configuration setting.

According to examples of the present disclosure, the radio bearer may be associated to a Protocol Data Unit, PDU, Session, and checking the message for a ciphering configuration setting for the radio bearer may comprise checking for a ciphering configuration setting for application to all radio bearers associated to that PDU Session.

According to another aspect of the present disclosure, there is provided a method performed by a base station for configuring radio resources for use by a wireless device. The method comprises generating a message configuring a radio bearer for use by the wireless device, including in the message a ciphering configuration setting enabling or disabling ciphering for the radio bearer, and transmitting the message to the wireless device.

According to examples of the present disclosure, the method may further comprise comparing the ciphering configuration setting for the radio bearer to a reference ciphering configuration setting for the radio bearer, and including the ciphering configuration setting for the radio bearer in the generated message only if the ciphering configuration setting differs from the reference ciphering configuration setting.

According to examples of the present disclosure, if the radio bearer configured by the message is not part of the current configuration for the wireless device, the reference ciphering configuration setting may comprise a default ciphering configuration setting, and if the radio bearer configured by the message is part of the current configuration for the wireless device, the reference ciphering configuration setting may comprise the existing ciphering configuration setting for the radio bearer.

According to examples of the present disclosure, the message may comprise a Radio Resource Control, RRC, Reconfiguration message.

According to examples of the present disclosure, including a ciphering configuration setting for the radio bearer in the message may comprise including the ciphering configuration setting in an Information Element inside a RadioBearerConfig Information Element.

According to examples of the present disclosure, the message may configure a plurality of radio bearers for the wireless device, and including a ciphering configuration setting for the radio bearer in the message may comprise including the ciphering configuration setting in an Information Element specific to the radio bearer.

According to examples of the present disclosure, the Information Element specific to the radio bearer may comprise pdcp-Config.

According to examples of the present disclosure, the Information Element specific to the radio bearer may comprises, for a data radio bearer, the DRB-ToAddMod Information Element, and for a signalling radio bearer, the SRB-ToAddMod Information Element.

According to examples of the present disclosure, including a ciphering configuration setting for the radio bearer in the message may comprise including the ciphering configuration setting after the extension marker of the Information Element.

According to examples of the present disclosure, the ciphering configuration setting may comprise an Optional parameter, the optional parameter comprising a single bit indicating if ciphering should be enabled or disabled.

According to examples of the present disclosure, including a ciphering configuration setting for the radio bearer in the message may comprise including the ciphering configuration setting before the extension marker of the Information Element, and the ciphering configuration setting may comprise an Optional Enumerated (enabled)—Need R parameter.

According to examples of the present disclosure, the message may configure a plurality of radio bearers for the UE, and including a ciphering configuration setting for the radio bearer in the message may comprise including the ciphering configuration setting in an Information Element applicable to all radio bearers configured by the message.

According to examples of the present disclosure, the Information Element applicable to all radio bearers configured by the message may comprise the SecurityConfig Information Element.

According to examples of the present disclosure, including a ciphering configuration setting for the radio bearer in the message may comprise including a list of ciphering configuration settings for radio bearers configured by the message.

According to examples of the present disclosure, the list may specify ciphering configuration settings per radio bearer identity.

According to examples of the present disclosure, the list may comprise only ciphering configuration settings for those bearers for which the ciphering configuration setting differs from the reference ciphering configuration setting.

According to examples of the present disclosure, the radio bearer may be associated to a Protocol Data Unit, PDU, Session, and including a ciphering configuration setting for the radio bearer in the message may comprise including a ciphering configuration setting for application to all radio bearers associated to that PDU Session.

According to another aspect of the present disclosure, there is provided a wireless device for managing radio resources in the wireless device. The wireless device comprises processing circuitry configured to perform any of the steps of methods according to any of the aspects, examples or embodiments described herein, and power supply circuitry configured to supply power to the wireless device.

According to another aspect of the present disclosure, there is provided a base station for configuring radio resources for use by a wireless device. The base station comprises processing circuitry configured to perform any of the steps of methods according to any of the aspects, examples or embodiments described herein, and power supply circuitry configured to supply power to the base station.

According to another aspect of the present disclosure, there is provided a user equipment (UE) for managing radio resources in the wireless device. The UE comprises an antenna configured to send and receive wireless signals, and radio front-end circuitry connected to the antenna and to processing circuitry and configured to condition signals communicated between the antenna and the processing circuitry, the processing circuitry being configured to perform any of the steps of methods according to any of the aspects, examples or embodiments described herein. The UE further comprises an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
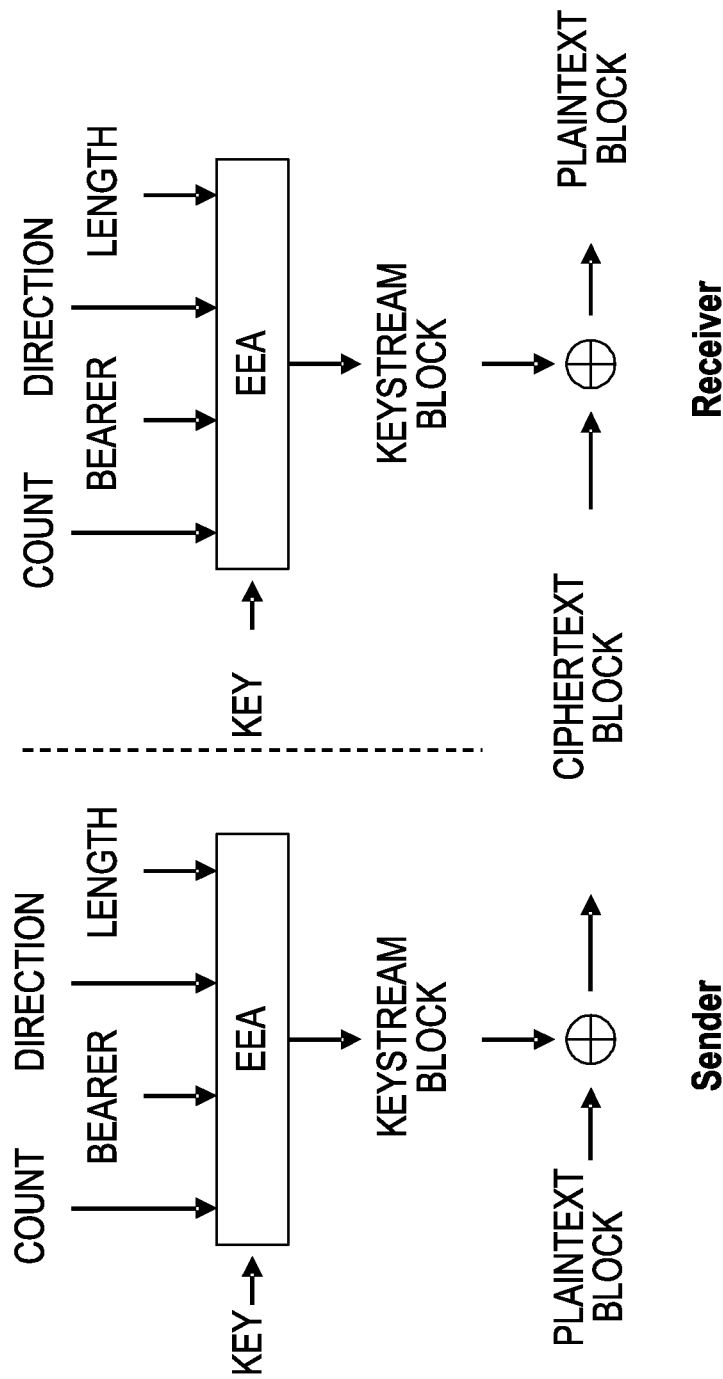
FIG. 1 illustrates the use of the ciphering algorithm EEA to encrypt plaintext.
Figure 2:
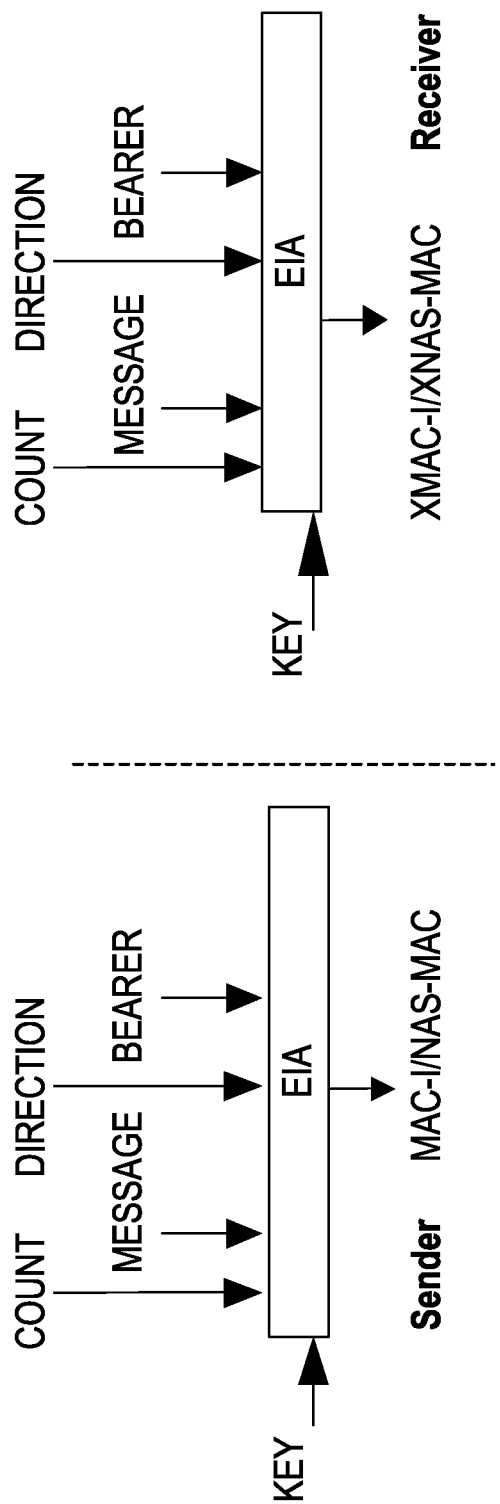
FIG. 2 illustrates the use of the integrity algorithm EIA to authenticate the integrity of messages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following, some messages and Information Elements are disclosed. To improve the readability parts of the content of the messages and information elements have been removed and replaced by "[ . . . ]".

As mentioned above, it has been agreed that for NR, ciphering and integrity protection should be configurable for at least each PDU session, and possibly each DRB. In greater detail, it has been decided that (See 3GPP TS 33.501, Technical Specification Group Services and System Aspects; Security architecture and procedures for 5G system (Release 15), v1.0.0, 2018-03):

Confidentiality protection of user data between the UE and the gNB is optional to use.

Confidentiality protection of the RRC-signalling is optional to use.

Confidentiality protection should be used whenever regulations permit.

Integrity protection of the user data between the UE and the gNB is optional to use and shall not use NIA0.

Integrity protection of the user plane adds the overhead of the packet size and increases the processing load both in the UE and the gNB. NIA0 will add an unnecessary overhead of 32-bits MAC with no security benefits.

All RRC signalling messages except those explicitly listed in 3GPP TS 38.331, Technical Specification Group Radio Access Network; NR; Radio Resource Control (RRC) protocol specification (Release 15), v15.1.0, 2018-03 as exceptions shall be integrity-protected.

It has been further agreed that:

Agreements for NG-EN-DC and NE-DC and NR SA:

UP integrity protection can be configured on a per radio bearer (i.e., per DRB) basis.

Additional Agreements:

If integrity protection applies to a PDU session then it is applied to all DRBs of the PDU session.

If ciphering applies to a PDU session then it is applied to all DRBs of the PDU session.

Signalling may still be per DRB and the above constraints ensured by network configuration.

It is proposed in TS 38.331 that configuration for integrity protection be introduced to the pdcp-Config Information Element for DRBs, as illustrated below:

PDCP-Config Information Element

```
-- ASN1START
-- TAG-PDCP-CONFIG-START
PDCP-Config ::=         SEQUENCE {
   drb                       SEQUENCE {
   [...]
      integrityProtection    ENUMERATED { enabled }    OPTIONAL, -- Cond
                                                          ConnectedTo5GC
      statusReportRequired   ENUMERATED { true }       OPTIONAL, -- Cond
                                                          Rlc-AM
      outOfOrderDelivery     BOOLEAN
   }
   [...]
-- TAG-PDCP-CONFIG-STOP
-- ASN1STOP
```

Field Description of the field integrityProtection in the above PDCP-Config IE is as follows:
integrityProtection
Indicates whether or not integrity protection is configured for this radio bearer. The value of integrityProtection for a DRB can only be changed using reconfiguration with sync.

Integrity protection is already possible to configure per DRB in the pdcp-config IE.

According to an example of the present disclosure, a new parameter, or configuration setting for enabling or disabling ciphering for radio bearers, including both DRBs and SRBs, may be included in the pdcp-Config Information Element. This may enable ciphering configuration and reconfiguration as illustrated below:
PDCP-Config Information Element

```
-- ASN1START
-- TAG-PDCP-CONFIG-START
PDCP-Config ::=       SEQUENCE {
   drb                SEQUENCE {
   [...]
      integrityProtection    ENUMERATED { enabled }   OPTIONAL, -- Cond
                                                        ConnectedTo5GC
      statusReportRequired   ENUMERATED { true }      OPTIONAL, -- Cond
                             Rlc-AM
      outOfOrderDelivery     BOOLEAN
   }                                                  [...]
   ...
   [[
   ciphering         ENUMERATED { enabled, disabled } OPTIONAL, -- Need S
   ]]
}
[...]
-- TAG-PDCP-CONFIG-STOP
-- ASN1STOP
```

The "ciphering" field in the above pdcp-Config IE indicates whether or not ciphering is enabled for this radio bearer. In some examples, the value of ciphering for a radio bearer may only be changed using reconfiguration with sync. When the field is not included, the UE may continue to use the currently configured ciphering configuration. If the field is not included during radio bearer setup or reconfiguration to NR PDCP, the UE may apply a default ciphering configuration. All DRBs within a PDU session may have the same configuration of ciphering.

In some examples of the present disclosure, if the new ciphering parameter can be included before the extension marker (rendering the IE non-backward compatible), it may be included as an Enumerated (enabled) parameter, instead of an optional Boolean parameter (as illustrated), as this would not incur the overhead associated with the extension marker.

Although according to certain examples of the present disclosure it is possible to modify the ciphering settings during each radio bearer modification, this will result in additional bits in the pdcp-Config IE for every radio bearer configured (as discussed in further detail below with reference to different IEs). A likely scenario is that a UE is initially configured with a security setting and only seldom needs to change this setting. Some examples of the present disclosure, therefore, propose that ciphering settings be signalled only in the event that the ciphering setting differ from a reference setting, which may be a default setting or an existing setting for a radio bearer that is already configured for the UE. In this manner, the signalling overhead to maintain current security configurations may be minimized. In addition, it is likely that a majority of UEs will use the same configurations as in LTE i.e., ciphering activated for DRBs and SRBs. It may be that only a small fraction of UEs will need to configure a UE to not use ciphering, possibly only for a subset of the radio bearers. Some examples of the present disclosure therefore propose that ciphering activated be a default ciphering configuration. According to further examples of the present disclosure, ciphering not activated nay alternately be used as the default configuration.

One scenario in which a non-default setting may be required could be the case of Integrated Access Backhauling, where it may be desirable to disable the ciphering over the bearers of the backhaul links, as the data packets are already protected by the PDCP of the end nodes. Otherwise, every radio bearer configuration would need to add the parameters as an extension to the IE, incurring at least an additional 16 bits per configured DRB.

In accordance with examples of the present disclosure in which ciphering settings are only signalled if they differ from an existing or default configuration, the ciphering settings may be included as optional extensions, with the configurations maintained if not included. During radio bearer setup or reconfiguration to NR PDCP, the UE may use default configuration (for example ciphering enabled).

Thus, according to certain examples of the present disclosure, if the ciphering parameter is added as an extension to pdcp-Config, this may in some examples only be included during setup if the UE should not use the default setting (for example ciphering enabled), and during reconfiguration, if the UE should change the ciphering setting.

According to one example of the present disclosure, the text of 3GPP TS 38.331, Technical Specification Group Radio Access Network; NR; Radio Resource Control (RRC) protocol specification (Release 15), v15.1.0, 2018-03 may be modified as indicated below:

5.3.5.6.5 DRB Addition/Modification

The UE shall:
1> for each drb-Identity value included in the drb-ToAddModList that is not part of the current UE configuration (DRB establishment including the case when full configuration option is used):
    2> establish a PDCP entity and configure it in accordance with the received pdcp-Config;
    2> if ciphering is included in pdcp-config:
        3> store the received ciphering value;
    2> else:
        3> set the value of ciphering to enabled
    2> if ciphering is enabled:
        3> configure the PDCP entity of this radio bearer with the ciphering algorithms according to securityConfig and apply the keys ($K_{UPenc}$) associated with the $K_{eNB}$/S-$K_{gNB}$ as indicated in keyToUse;
    2> else:
        3> configure the PDCP entity of this radio bearer to not apply any ciphering algorithms;
    2> if integrityProtection is enabled:
        3> configure the PDCP entity of this radio bearer with the integrity protection algorithms according to securityConfig and apply the keys ($K_{UPint}$) associated with the $K_{eNB}$/S-$K_{gNB}$ as indicated in keyToUse;
    2> else:
        3> configure the PDCP entity of this radio bearer to not apply any integrity protection algorithms
    2> if the DRB was configured with the same eps-BearerIdentity either by NR or E-UTRA prior to receiving this reconfiguration:
        3> associate the established DRB with the corresponding eps-BearerIdentity
    2> else:
        3> indicate the establishment of the DRB(s) and the eps-BearerIdentity of the established DRB(s) to upper layers;
1> for each drb-Identity value included in the drb-ToAddModList that is part of the current UE configuration:
    2> if reestablishPDCP is set:
        3> if ciphering is included in pdcp-config:
            4> store the received ciphering value;
        3> else:
            4> set the value of ciphering to enabled;
        3> if ciphering is set to enabled:
            4> configure the PDCP entity of this radio bearer to apply the ciphering algorithm and $K_{UPenc}$ key associated with the KeNB/S-KgNB as indicated in keyToUse, i.e. the ciphering configuration shall be applied to all subsequent PDCP PDUs received and sent by the UE;
        3> else:
            4> configure the PDCP entity of this radio bearer to not apply any ciphering configuration.
        3> if integrityProtection is enabled:
            4> configure the PDCP entity of this radio bearer to apply the integrity protection algorithm and $K_{UPint}$ key associated with the KeNB/S-KgNB as indicated in keyToUse, i.e. the integrity protection configuration shall be applied to all subsequent PDCP PDUs received and sent by the UE;
        3> else:
            4> configure the PDCP entity of this radio bearer to not apply any integrity protection configuration.
        3> re-establish the PDCP entity of this DRB as specified in 38.323 [5], section 5.1.2;
    2> else, if recoverPDCP is set:
        3> trigger the PDCP entity of this DRB to perform data recovery as specified in 38.323;
    2> if the pdcp-Config is included:
        3> reconfigure the PDCP entity in accordance with the received pdcp-Config.

NOTE 1: Removal and addition of the same drb-Identity in a single radioResourceConfig is not supported. In case drb-Identity is removed and added due to reconfiguration with sync or re-establishment with the full configuration option, the network can use the same value of drb-Identity.

NOTE 2: When determining whether a drb-Identity value is part of the current UE configuration, the UE does not distinguish which RadioBearerConfig and DRB-ToAddModList that DRB was originally configured in. To re-associate a DRB with a different key (KeNB to S-KgNB or vice versa) or modify the application of security configurations, the network provides the drb-Identity value in the (target) drb-ToAddModList and sets the reestablishPDCP flag. The network does not list the drb-Identity in the (source) drb-ToReleaseList.

NOTE 3: When setting the reestablishPDCP flag for a radio bearer, the network ensures that the RLC receiver entities do not deliver old PDCP PDUs to the re-established PDCP entity. It does that e.g., by triggering a reconfiguration with sync of the cell group hosting the old RLC entity or by releasing the old RLC entity.

NOTE 4: In this specification, UE configuration refers to the parameters configured by NR RRC unless otherwise stated.

According to examples of the present disclosure, the text of 3GPP TS 38.331 may be further modified to set out the pdcp-Config Information Element including the "ciphering" field as set out above.

According to another example of the present disclosure, the settings for enabling and/or disabling the ciphering for DRBs may be delivered in the DRB-ToAddMod information element (IE) inside the RadioBearerConfig IE.

Below the current DRB-ToAddMod IE as defined in 3GPP TS 38.331 (v15.1.0) is shown:
RadioBearerConfig Information Element

```
-- ASN1START
-- TAG-RADIO-BEARER-CONFIG-START
RadioBearerConfig ::=                    SEQUENCE {
    srb-ToAddModList    SRB-ToAddModList        OPTIONAL, -- Need N
    srb3-ToRelease      ENUMERATED{true}        OPTIONAL, -- Need N
    drb-ToAddModList    DRB-ToAddModList        OPTIONAL, -- Need N
    drb-ToReleaseList   DRB-ToReleaseList       OPTIONAL, -- Need N
    securityConfig      SecurityConfig          OPTIONAL, -- Cond M
    ...
}
[...]
    ...
}
DRB-ToAddModList ::=     SEQUENCE (SIZE (1..maxDRB)) OF DRB-ToAddMod
DRB-ToAddMod ::=         SEQUENCE {
    cnAssociation            CHOICE {
        --  The EPS bearer ID determines the EPS bearer when NR connects
to EPC using EN-DC
            eps-BearerIdentity  INTEGER (0..15),        -- EPS-DRB-Setup
        --  The SDAP configuration determines how to map QoS flows to
DRBs when NR connects to the 5GC
            sdap-Config     SDAP-Config             -- 5GC
    }                       OPTIONAL,               -- Cond DRBSetup
    drb-Identity            DRB-Identity,
    --      may only be set if the cell groups of all linked logical channels
are reset or released
    reestablishPDCP     ENUMERATED{true}        OPTIONAL, -- Need N
    recoverPDCP         ENUMERATED{true}        OPTIONAL, -- Need N
    pdcp-Config         PDCP-Config             OPTIONAL, -- Cond PDCP
    ...
}
DRB-ToReleaseList ::=    SEQUENCE (SIZE (1..maxDRB)) OF DRB-Identity
SecurityConfig ::=       SEQUENCE {
    securityAlgorithmConfig   SecurityAlgorithmConfig      OPTIONAL,-- Cond
                                                           RBTermChange
    keyToUse            ENUMERATED{keNB, s-KgNB}  OPTIONAL,-- Cond
                                                           RBTermChange
    ...
}
-- TAG-RADIO-BEARER-CONFIG-STOP
-- ASN1STOP
```

As for the addition of the ciphering parameter to the pdcp-Config IE, in order to add new fields to the DRB-ToAddMod IE, the parameters could either be placed before the extension marker (the ellipsis, ' . . . '), which would render the message non-backward compatible, or they could be placed directly after the extension marker. If the added fields are placed after the extension marker, an additional 16 bits (2 octets) are introduced describing the length of the extension. These additional 16 bits are generated when the message is compiled using an ASN.1 compiler. The added parameter would then add additional bits on top of the bits caused by the extension marker. As the DRB-ToAddMod IE is per DRB, this overhead would be per each DRB (in NR currently the UE can be configured with 29 DRBs, meaning the extension marker will increase the message size of up to 464 bits). However, in examples of this disclosure, it is proposed to make the added parameter optional, meaning that if the network does not need to change the settings no extra bits are added due to the extension marker. This is shown below.

```
DRB-ToAddModList ::=    SEQUENCE (SIZE (1..maxDRB)) OF DRB-ToAddMod
DRB-ToAddMod ::=        SEQUENCE {
  [...]
  ...,
  [[
    useCiphering          BOOLEAN    OPTIONAL -- Need M
  ]]
}
```

The extension includes the parameter named for example useCiphering. The parameter is Boolean: if set to true, the ciphering is enabled and if set to false, the ciphering is disabled. Other parameter names may be envisaged, for example cipheringDisabled, which may also be set to true or false. As discussed above with respect to the example in which the parameter is added to the pdcp-Config IE, the parameter is optional. If the parameter is not included then the UE should continue to use the previous setting. Furthermore, and also as discussed above, in order to optimize the performance even more it is proposed to define a default value for the parameters which can be used at initial setup of new bearers. In this way, it is not required to signal the parameter at the initial setup if the default setting should be used (e.g. the default setting could be useCiphering=True). The default setting could be defined in the standard. This is described further below.

Figure 3:
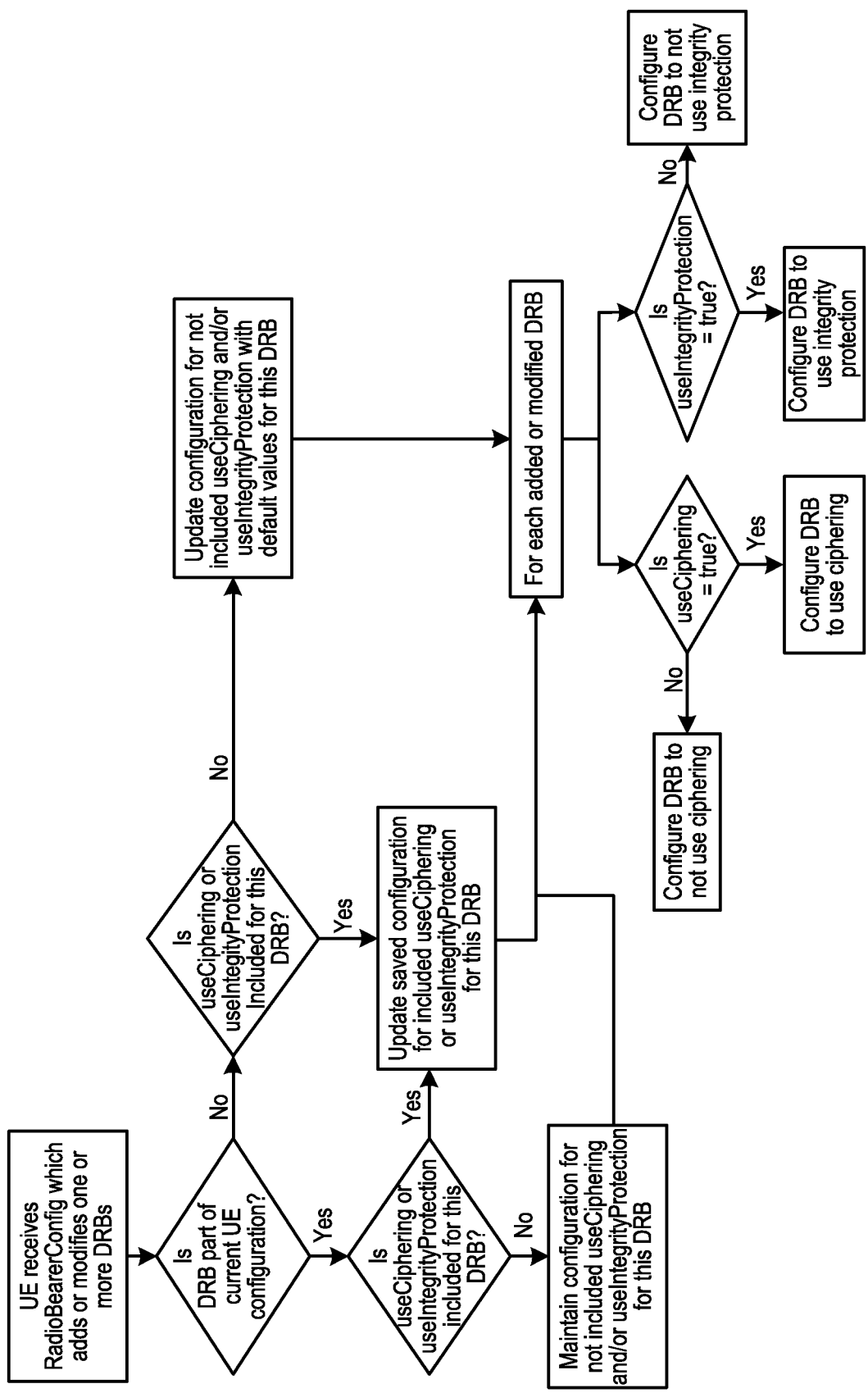
FIG. 3 is a flow chart illustrating User Equipment behaviour according to an example of the present disclosure.

When the new parameter is included in the RadioBearerConfig message, the extension marker adds 16 bits for every DRB to be (re-)configured as well as one bit for a parameter not changed (due to the optionality flag) and two bits for a parameter which is changed. So, if the parameter is changed the message is increased by 18 bits for every DRB which needs to change the setting. As the majority of UEs are likely to use the same setting with ciphering enabled, it is cumbersome to configure these settings for every DRB which is setup or reconfigured. Instead, this common setting can be made as a default setting, so that if the parameter is not included during setup, the UE applies the default setting. In addition, if the UE has previously been configured with a specific setting of this parameter, then when the DRBs are modified (during e.g. handover or change of termination point), the UE can keep using the previous setting if the parameter is not included. This UE behaviour is illustrated in the flow chart of FIG. 3 with the example parameter name "useCiphering". It will be appreciated that a corresponding procedure may be followed for other example parameter names, such as "apheringDisabled", which, if present and true, indicates that ciphering should not be used.

In order to be able to apply default setting, this setting may be specified. This could be done by including it in the field description or by including the preferred setting to section 9.2 (Default radio configurations) of 3GPP TS 38.331. Currently only default SRB configurations are included.

As discussed above, a likely candidate for default configuration would be to enable ciphering, as is the baseline from LTE. Thus, only the few UE which would need a different configuration would need to be configured:

| 9.2.x Default DRB configurations | | | |
|---|---|---|---|
| Name | Value | Semantics description | Ver |
| securitySettingsForDRB >useCiphering | true | | |

In another example of the present disclosure, the setting for ciphering may be included in another IE, or as a separate IE not part of the DRB-ToAddMod configuration. Several sub-examples could be considered as set out below.

In a first sub-example, the same setting may be used for all the bearers. In this case, the overhead is reduced since only one instance of the useCiphering parameter may be added. The drawback is that it is not possible to apply different settings for different DRBs, which may be required for operational purposes.

In one example of the present disclosure, the parameter could be added to SecurityConfig, which applies to all bearers configured:

```
SecurityConfig ::=      SEQUENCE {
  securityAlgorithmConfig   SecurityAlgorithmConfig    OPTIONAL, -- Cond
                                                                  RBTermChange
  keyToUse                  ENUMERATED{keNB, s-KgNB}   OPTIONAL, -- Cond
                                                                  RBTermChange
  ...,
  [[
    useCiphering            BOOLEAN                    OPTIONAL -- Need M
  ]]
}
```

In another sub-example, a separate list of the security setting may be signalled. In this case each element of the list could contain a DRB setting for useCiphering and be associated with a DRB ID. The association could be handled by signalling the DRB ID or by associating the first security configuration element in the list with the first DRB on the DRB list (e.g., DRB-ToAddModList). Thus, the radio bearer identities may be explicitly included in the list of security settings or may be implicitly included by ordering the list of security settings to match a list of radio bearers included elsewhere in the message. Examples of such radio bearer lists include those of the DRB-ToAddModList and the SRB-ToAddModList (for SRBs, as discussed in further detail below). An advantage of this sub-example is that it is not required to use an extension marker for every DRB.

In one example, the list could be added to SecurityConfig, and specify which bearers are affected:

```
SecurityConfig ::=          SEQUENCE {
    securityAlgorithmConfig  SecurityAlgorithmConfig          OPTIONAL, -- Cond
                             RBTermChange
    keyToUse                 ENUMERATED{keNB, s-KgNB}         OPTIONAL, -- Cond
                             RBTermChange
    ...,
    [[
    securitySettingForDRBsList ::= SEQUENCE (SIZE (1..maxDRB)) OF
        SecuritySettingForDRBsList
    ]]
}
SecuritySettingForDRBs ::= SEQUENCE {
    drb-Identity             DRB-Identity,
    useCiphering             BOOLEAN                          OPTIONAL -- Need M
}
```

In this case only the DRBs which should have a non-default configuration could be signalled. However, if any DRB should have a non-default setting, the extension marker in the SecurityConfig will add 16 bits, regardless of how many of the DRBs should have changed setting.

In another sub-example, the configuration may be included in an IE distinguished by PDU session identity, so that the configurations are only signalled once per PDU session. As it has been agreed in RAN2 that any change of ciphering and/or integrity protection for a DRB should apply equally to all DRBs associated to the same PDU-session, it would be possible to set this configuration once per PDU-session instead. This could be captured in a separate IE as shown below (or inside another IE). This IE would then be called from e.g. RRCReconfiguration.

CipheringAndIPConfig Information Element

```
-- ASN1START
-- TAG-CIPHERING-AND-IP-CONFIG-START
CipheringAndIPConfig::=                SEQUENCE {
    pdu-Session                        PDU-SessionID,
    useCiphering                       BOOLEAN
}
PDU-SessionID ::= INTEGER (0..255)
-- TAG-CIPHERING-AND-IP-CONFIG-STOP
-- ASN1STOP
```

In this case, the useCiphering parameter is not optional. Making it optional would add one bit to the optionality flag. Below is shown an example of this call from RRCReconfiguation using a noncritical extension.

RRCReconfiguration Message

```
-- ASN1START
-- TAG-RRCRECONFIGURATION-START
RRCReconfiguration ::=           SEQUENCE {
    rrc-TransactionIdentifier    RRC-TransaetionIdentifier,
    criticalExtensions           CHOICE {
        rrcReconfiguration           RRCReconfiguration-IEs,
        criticalExtensionsFuture     SEQUENCE { }
    }
}
RRCReconfiguration-IEs ::=       SEQUENCE {
    [...]
    nonCriticalExtension         RRCReconfiguration-rxx-IEs OPTIONAL
}
RRCReconfiguration-rxx-IEs ::=   SEQUENCE {
    cipheringConfigList          cipheringConfigList      OPTIONAL -- Need M
    lateNonCriticalExtension     OCTET STRING             OPTIONAL,
    nonCriticalExtension         SEQUENCE { }             OPTIONAL
}
```

```
cipheringConfigList ::=        SEQUENCE (SIZE (1..maxNrOfPDU-
     Sessions)) OF CipheringConfig
-- TAG-RRCRECONFIGURATION-STOP
-- ASN1STOP
```

Here the configuration could either include all PDU sessions, or only the PDU sessions which would have non-default settings for ciphering.

In another sub-example, the configuration may be included in an SDAP IE. The SDAP layer is configured inside the DRB-ToAddMod IE for the DRBs connecting to 5GC. Inside the SDAP-Config, the configurations indicate which PDU-Session the SDAP layer is associated with:

```
DRB-ToAddModList ::=    SEQUENCE (SIZE (1..maxDRB)) OF DRB-ToAddMod
DRB-ToAddMod ::=        SEQUENCE {
   cnAssociation           CHOICE {
     [...]
     sdap-Config           SDAP-Config           -- 5GC
   }                       OPTIONAL, -- Cond DRBSetup
   drb-Identity            DRB-Identity,
   -- may only be set if the cell groups of all linked logical channels are reset or
   released
   reestablishPDCP         ENUMERATED{true}      OPTIONAL, -- Need N
   recoverPDCP             ENUMERATED{true}      OPTIONAL, -- Need N
   pdcp-Config             PDCP-Config           OPTIONAL, -- Cond PDCP
   ...
}
```

Inside the SDAP-Config, the configurations indicate which PDU-Session the SDAP layer is associated with. As the SDAP-Config is not part of the legacy releases (i.e. it is not applicable to EN-DC), it is possible to add parameters before the extension marker.

SDAP-Config Information Element

```
-- ASN1START
-- TAG-SDAP-CONFIG-START
SDAP-Config ::=            SEQUENCE {
   [...]
   useIntegrityProtection  BOOLEAN,
   useCiphering            BOOLEAN
   ...
}
[...]
-- TAG-SDAP-CONFIG-STOP
-- ASN1STOP
```

In further examples of the present disclosure, the ciphering may be made optional for the signalling radio bearers (SRBs) by introducing the same or similar fields as in previous examples to corresponding IEs e.g. the IE SRB-ToAddMod.

Figure 4:
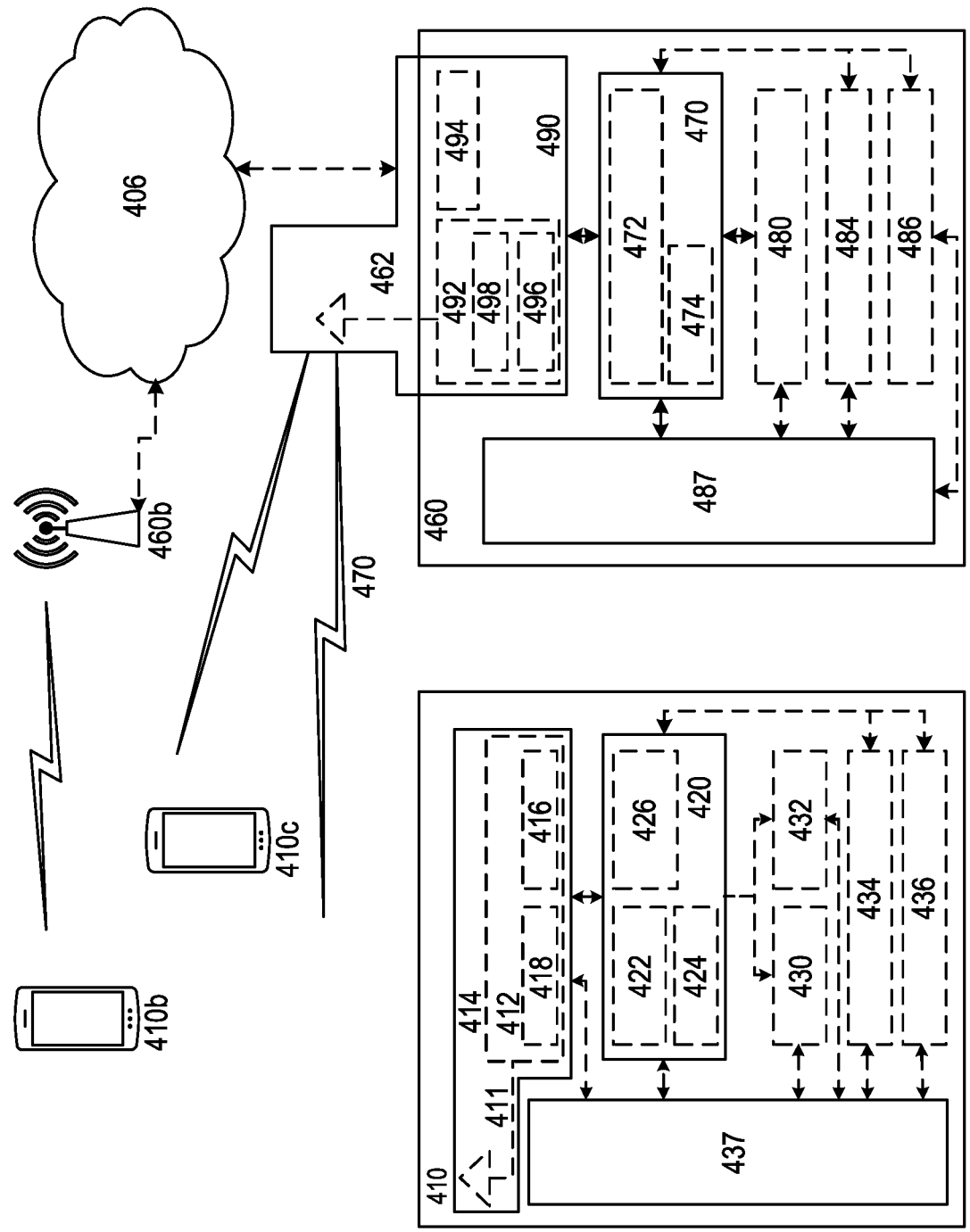
FIG. 4 illustrates a wireless network.

FIG. 4 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460*b*, and WDs 410, 410*b*, and 410*c*. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network. In some examples, the WDs 410, 410*b*, and 410*c* may operate similarly to the wireless device or UE described and illustrated previously and set out in the embodiments below. In some examples, the network nodes 460 and 460*b* may operate similarly to the base station described previously and set out in the embodiments below.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). The network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 1492 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device e A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 1412 is connected to antenna 411 and processing circuitry 420 and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality, may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410 and is connected to processing circuitry 420 to allow processing circuitry 420 to process the input information. User interface equipment 432 may include, for example, a microphone, a proximity sensor or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
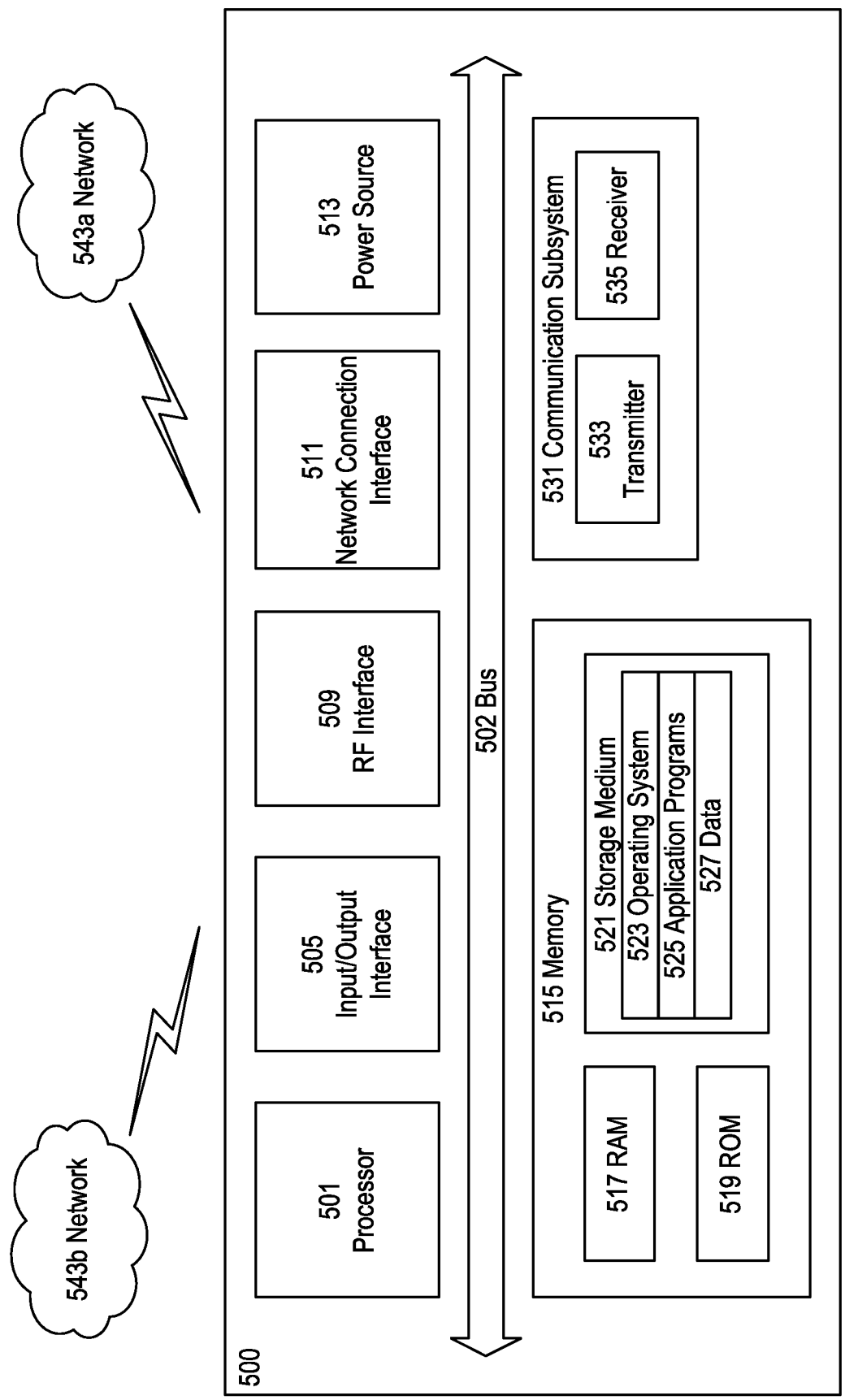
FIG. 5 illustrates a User Equipment.

FIG. 5 illustrates a User Equipment in accordance with some embodiments. FIG. 5 illustrates one embodiment of a UE in accordance with various aspects described herein. As used herein, a user equipment or UE may not necessarily have a user in the sense of a human user who owns and/or operates the relevant device.

Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the $3^{rd}$ Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeably. Accordingly, although FIG. 5 is a UE, the components discussed herein are equally applicable to a WD, and vice-versa. In some examples, the UE 500 may comprise a wireless device or UE as described and illustrated with respect to any of the examples and embodiments set out above and below.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, transmitter 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity module (SIM/RUIM), other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
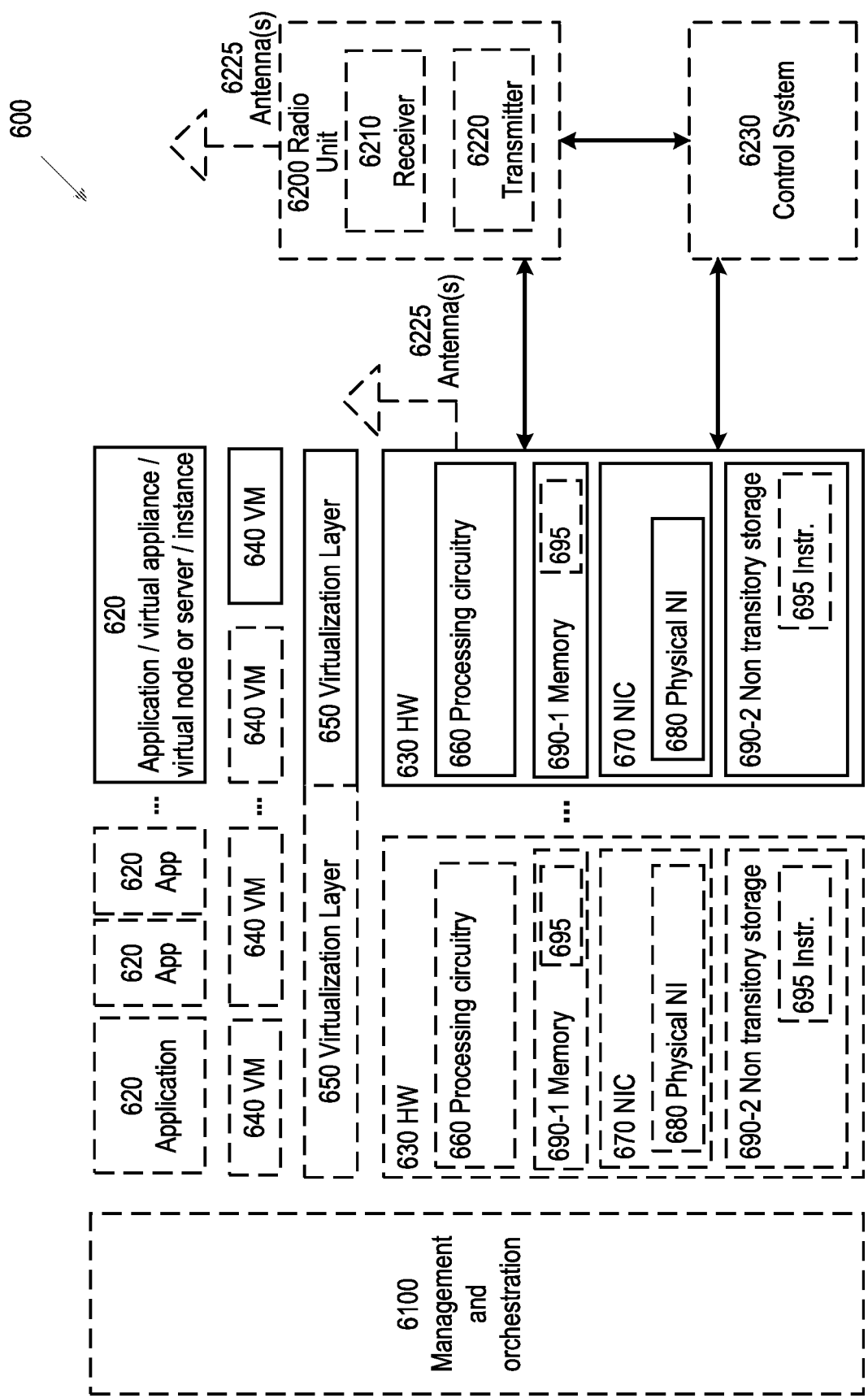
FIG. 6 illustrates a Virtualization environment.

FIG. 6 illustrates a Virtualization environment in accordance with some embodiments.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690-1. Memory 690-1 contains instructions 695 executable by processing circuitry 660 whereby application 620 is operative to provide one or more of the features, benefits, and/or functions disclosed herein.

Virtualization environment 600, comprises general-purpose or special-purpose network hardware 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g., such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network element (VNE).

Still in the context of NFV, Virtual Network Function (VNF) is responsible for handling specific network functions that run in one or more virtual machines 640 on top of hardware 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware 630 and radio units 6200.

Figure 7:
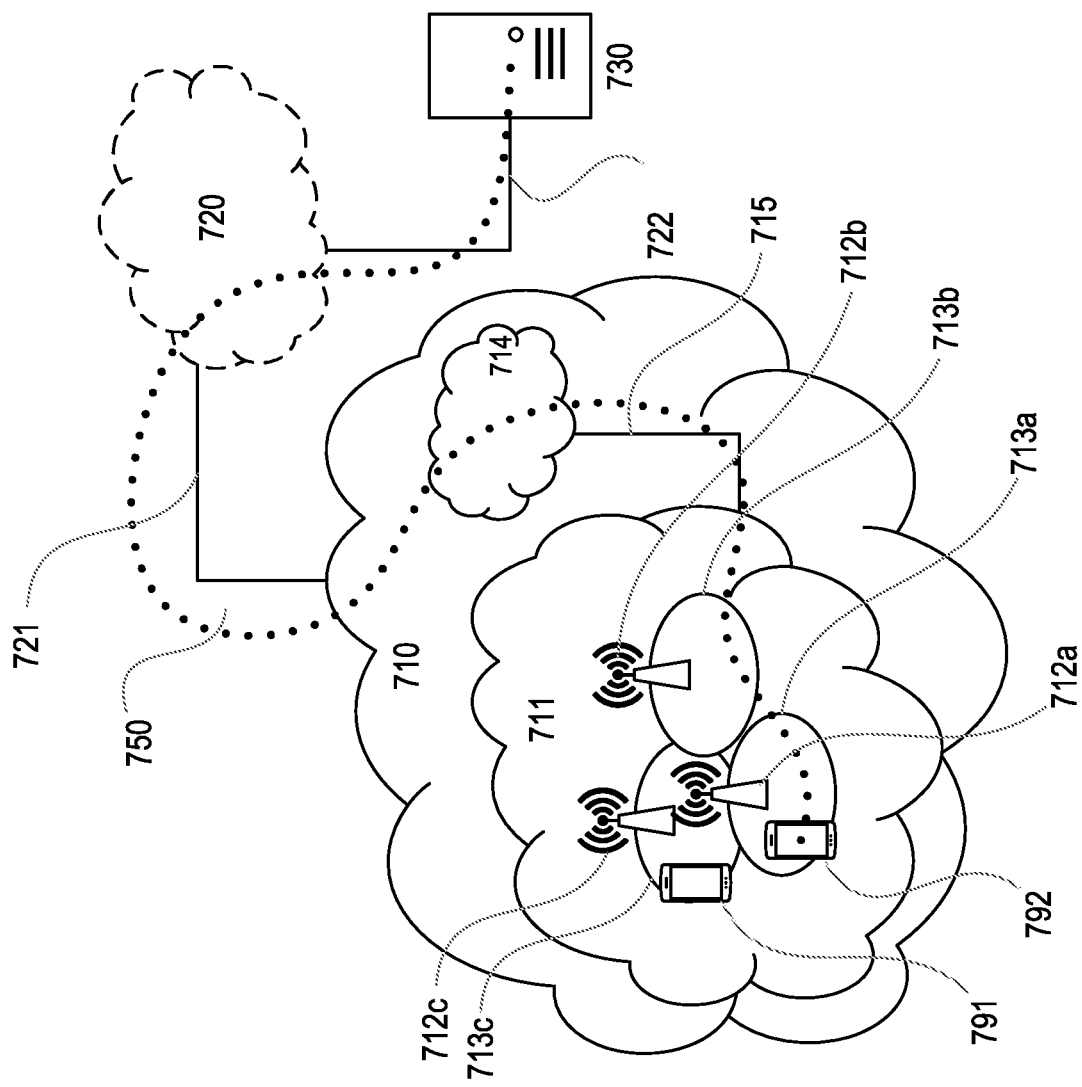
FIG. 7 illustrates a Telecommunication network connected via an intermediate network to a host computer.

FIG. 7 illustrates a Telecommunication network connected via an intermediate network to a host computer in accordance with some embodiments.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. Each base station 712a, 712b, 712c may be configured to operate as described and illustrated with respect to any of the base stations in the embodiments above and below. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. Each of the UEs 791, 792 may be configured to operate as described and illustrated with respect to any of the UEs or wireless devices in the embodiments above and below.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
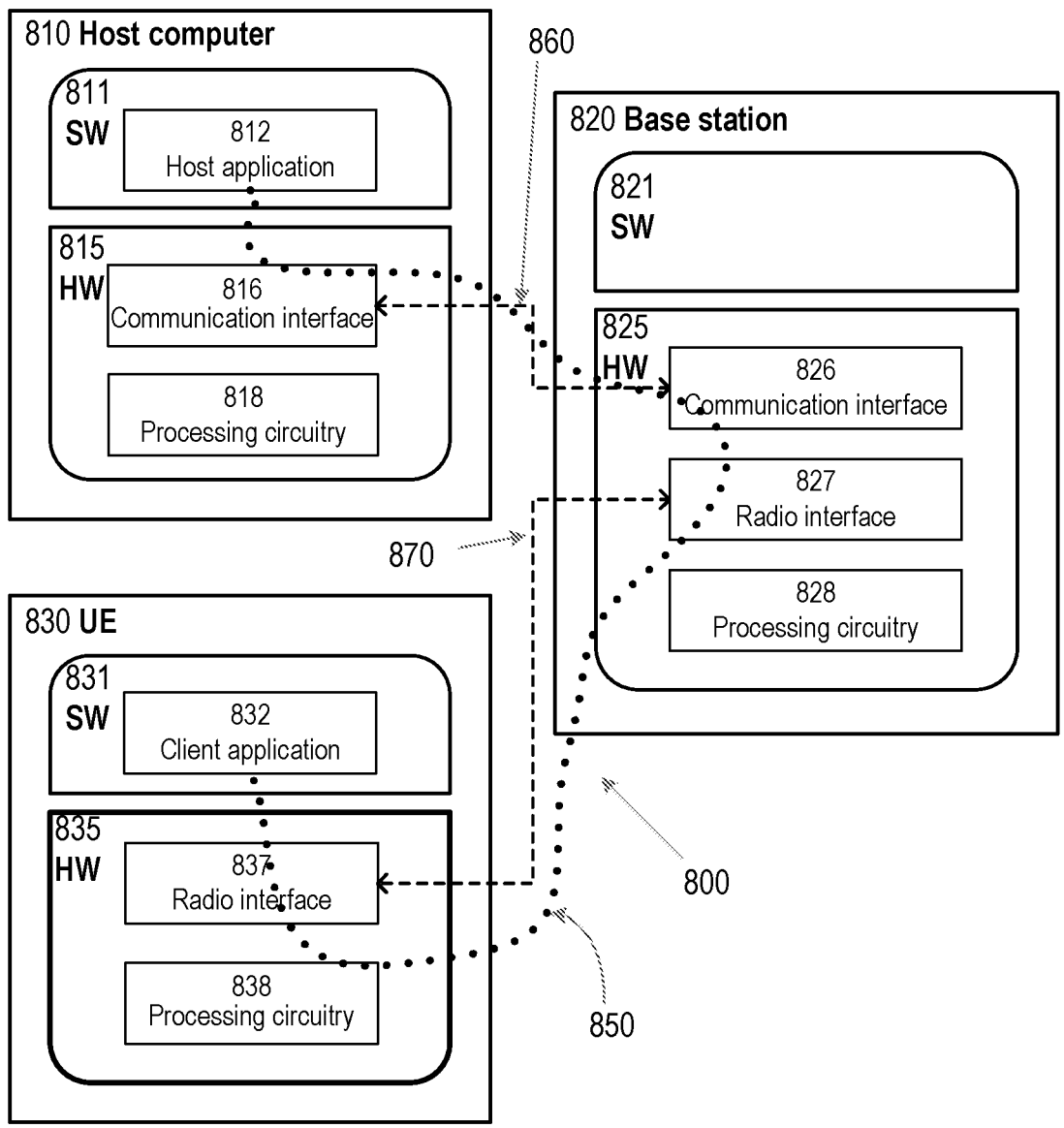
FIG. 8 illustrates a Host computer communicating via a base station with a user equipment over a partially wireless connection.

FIG. 8 illustrates a Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the reliability with which messages configuring radio resources may be received, leading to less risk of dropped connections and so better end user performance. The teachings of these embodiments may also provide faster signalling reducing delays experienced by end users and may improve energy efficiency owing to smaller transmissions with less overhead.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results.

The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc. The reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
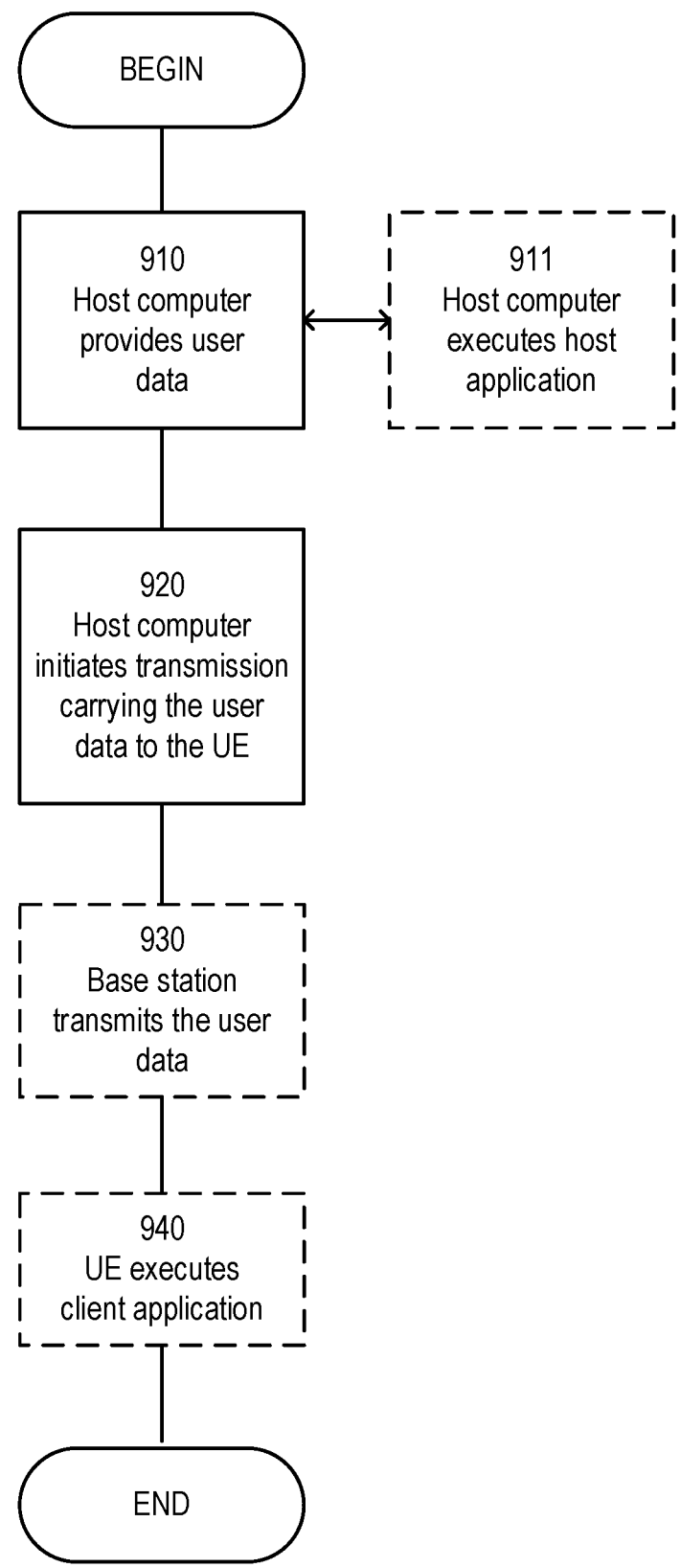
FIGS. 9 to 12 illustrate methods implemented in a communication system.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
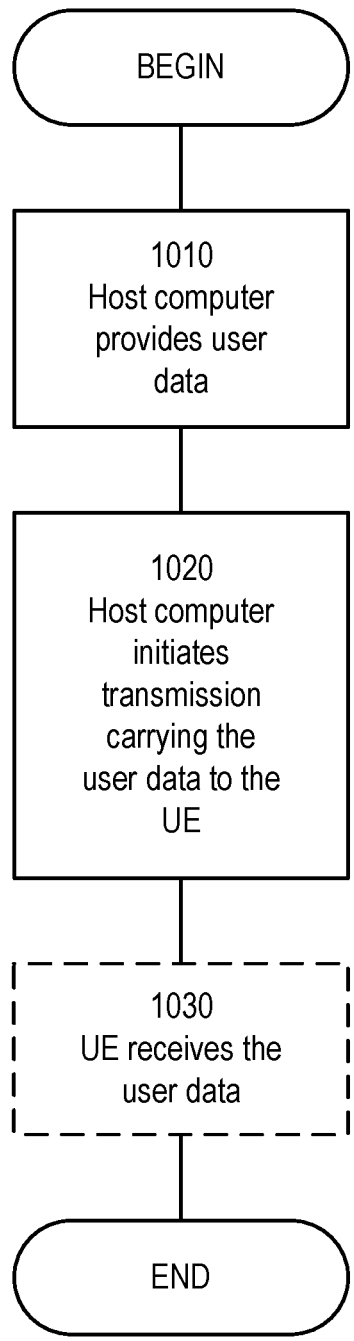

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
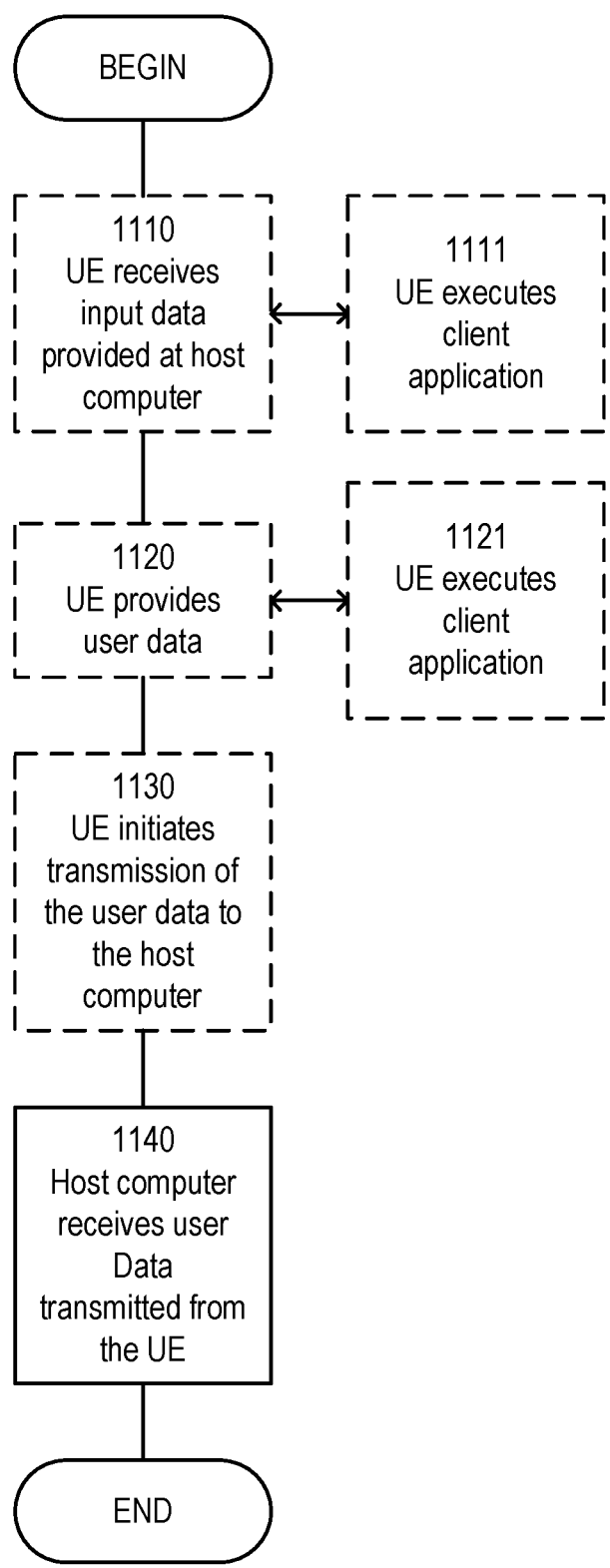

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in step 1130 (which may be optional), transmission of the user data to the host computer. In step 1140 of the method, the host computer receives the user data transmitted from the UE, in accordance with the teachings of the embodiments described throughout this disclosure.

Figure 12:
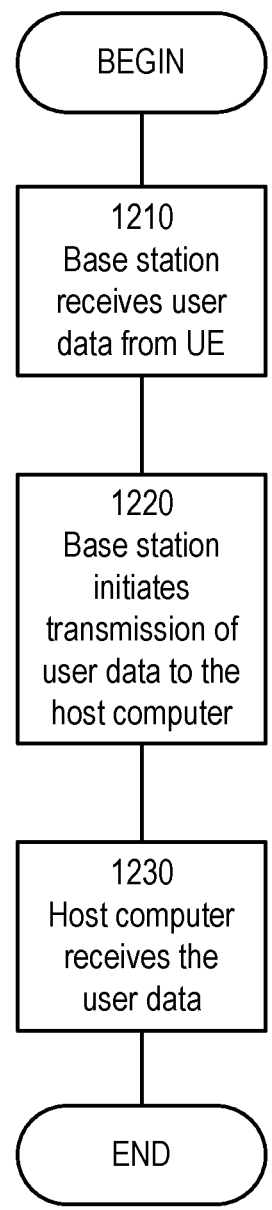

FIG. 12 illustrates methods implemented in a communication system including a host computer, a base station and a user equipment in accordance with some embodiments FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Figure 13:
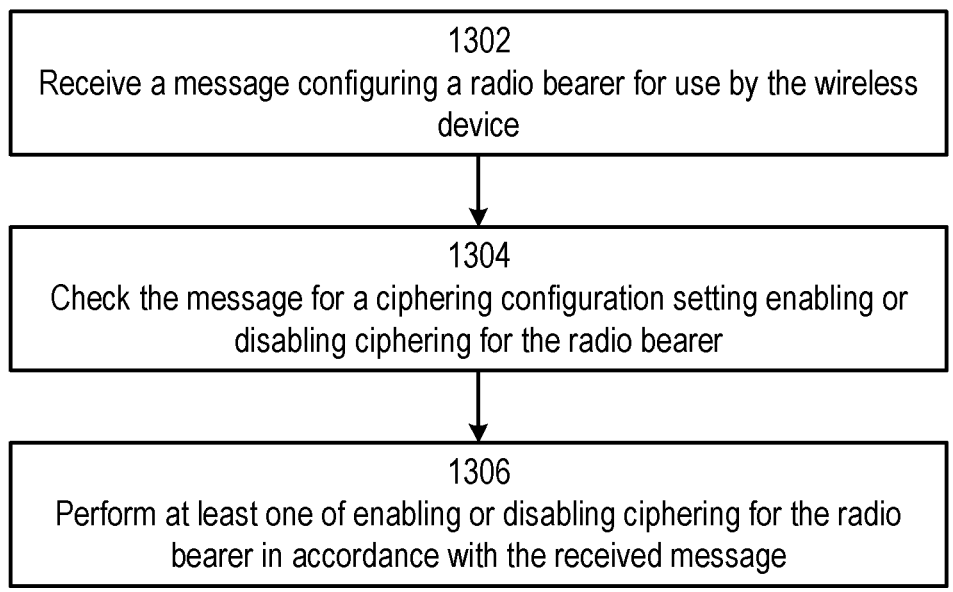
FIG. 13 illustrates a method in accordance with some embodiments of the present disclosure.

FIG. 13 illustrates a method in accordance with some embodiments. FIG. 13 depicts a method in accordance with particular embodiments, the method begins at step 1302 with receiving a message configuring a radio bearer for use by the wireless device. The method then comprises checking the message for a ciphering configuration setting enabling or disabling ciphering for the radio bearer at step 1304 and performing at least one of enabling or disabling ciphering for the radio bearer in accordance with the received message at step 1306.

Figure 14:
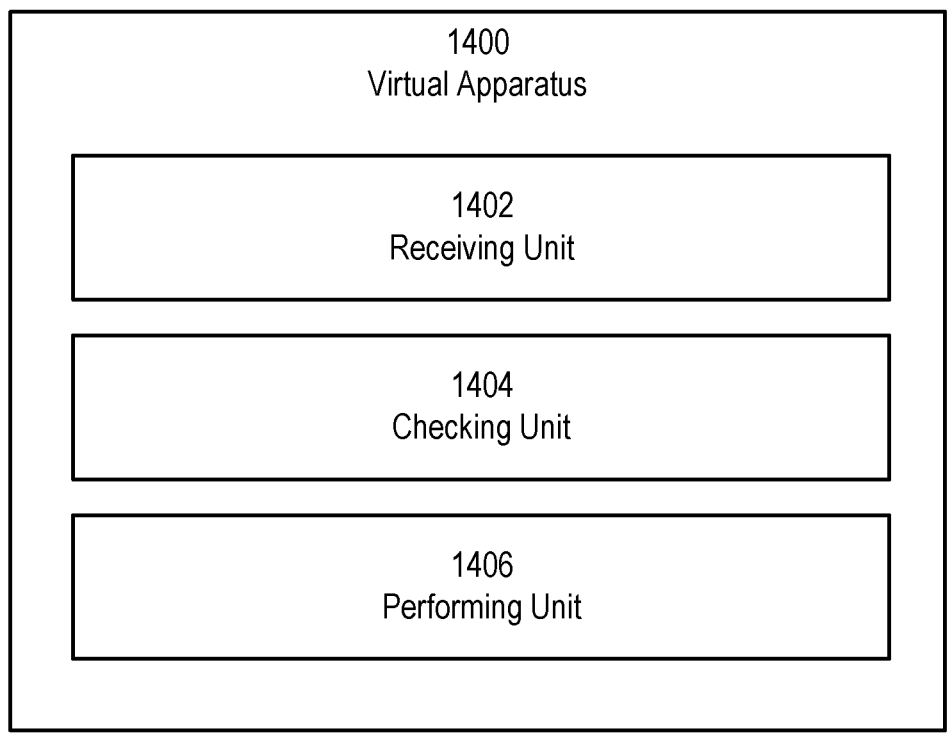
FIG. 14 illustrates a Virtualization apparatus in accordance with some embodiments of the present disclosure.

FIG. 14 illustrates a Virtualization apparatus in accordance with some embodiments. FIG. 14 illustrates a schematic block diagram of an apparatus 1400 in a wireless network (for example, the wireless network shown in FIG. 4). The apparatus may be implemented in a wireless device or network node (e.g., wireless device 410 or network node 460 shown in FIG. 4). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

As illustrated in FIG. 14, apparatus 1400 includes Receiving Unit 1402, Checking Unit 1404 and Performing Unit 1406. Receiving Unit 1402 is configured to receive a message configuring a radio bearer for use by the wireless device. Checking Unit 1404 is configured to check the message for a ciphering configuration setting enabling or disabling ciphering for the radio bearer. Performing Unit 1406 is configured to perform at least one of enabling or disabling ciphering for the radio bearer in accordance with the received message.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
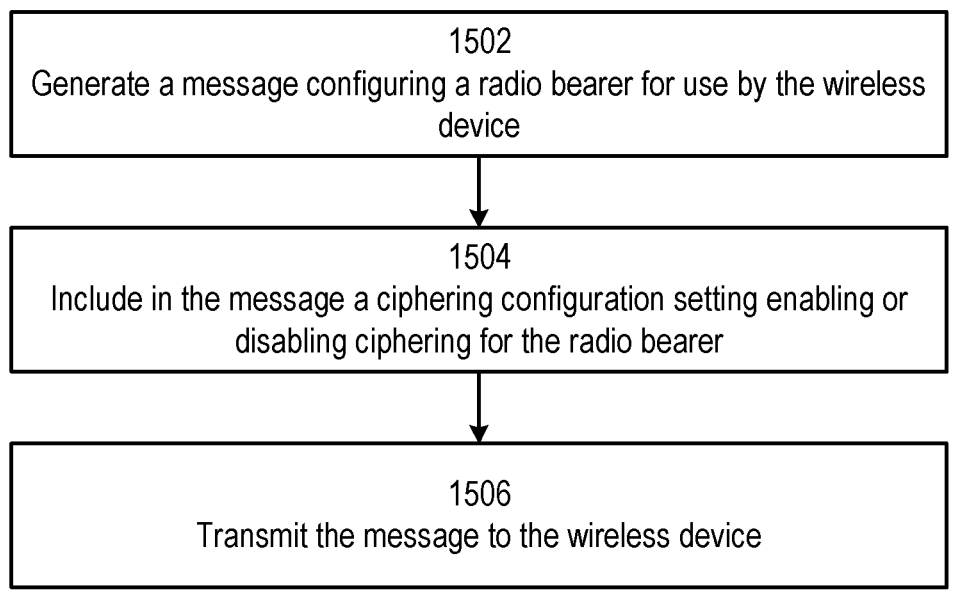
FIG. 15 illustrates a method in accordance with some embodiments of the present disclosure.

FIG. 15 illustrates a method in accordance with some embodiments. FIG. 15 depicts a method in accordance with particular embodiments, the method begins at step 1502 with generating a message configuring a radio bearer for use by the wireless device. The method then comprises including in the message a ciphering configuration setting enabling or disabling ciphering for the radio bearer at step 1504 and transmitting the message to the wireless device at step 1506.

Figure 16:
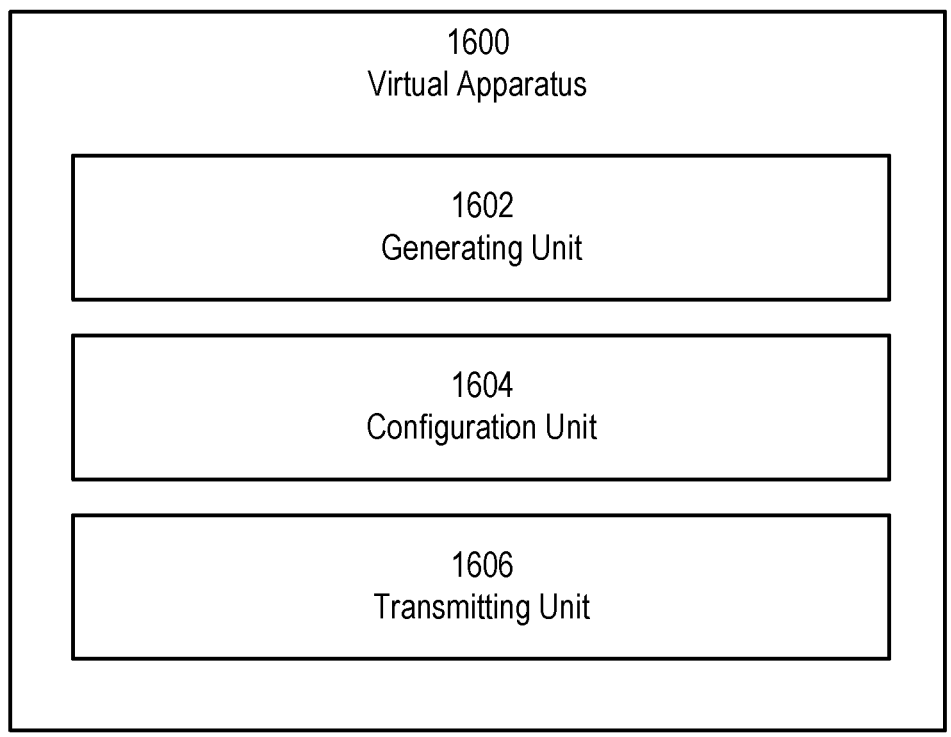
FIG. 16 illustrates a Virtualization apparatus in accordance with some embodiments of the present disclosure.

FIG. 16 illustrates a Virtualization apparatus in accordance with some embodiments. FIG. 16 illustrates a schematic block diagram of an apparatus 1600 in a wireless network (for example, the wireless network shown in FIG. 4). The apparatus may be implemented in a wireless device or network node (e.g., wireless device 410 or network node 460 shown in FIG. 4). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessors or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Generating Unit 1602, Configuration Unit 1604 and Transmitting Unit 1606, and any other suitable units of apparatus 1600 to perform corresponding functions according to one or more embodiments of the present disclosure.

As illustrated in FIG. 16, apparatus 1600 includes Generating Unit 1602, Configuration Unit 1604 and Transmitting Unit 1606. Generating Unit 1602 is configured to generate a message configuring a radio bearer for use by the wireless device. Configuration Unit 1604 is configured to include in the message a ciphering configuration setting enabling or disabling ciphering for the radio bearer. Transmitting Unit 1606 is configured to transmit the message to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following are certain enumerated embodiments further illustrating various aspects of the disclosed subject matter.

Group A Embodiments

1. A method performed by a wireless device for managing radio resources in the wireless device, the method comprising:
    receiving a message configuring a radio bearer for use by the wireless device; checking the message for a ciphering configuration setting enabling or disabling ciphering for the radio bearer; and
    performing at least one of enabling or disabling ciphering for the radio bearer in accordance with the received message.
2. The method of embodiment 1, wherein performing at least one of enabling or disabling ciphering for the radio bearer in accordance with the received message comprises:
    if the message includes a ciphering configuration setting for the radio bearer, performing at least one of enabling or disabling ciphering for the radio bearer in accordance with the ciphering configuration setting included in the message; and
    if the message does not include a ciphering configuration setting for the radio bearer, performing at least one of enabling or disabling ciphering for the radio bearer in accordance with a reference ciphering configuration setting for the radio bearer.
3. The method of embodiment 2, wherein:
    if the radio bearer configured by the message is not part of the current configuration for the wireless device, the reference ciphering configuration setting comprises a default ciphering configuration setting; and
    if the radio bearer configured by the message is part of the current configuration for the wireless device, the reference ciphering configuration setting comprises the existing ciphering configuration setting for the radio bearer.
4. The method of embodiment 3, wherein the default ciphering configuration setting is specified in at least one of:
    a field description;
    a communication standards document.
5. The method of embodiment 3 or 4, wherein the default ciphering configuration setting is use of ciphering for the radio bearer.
6. The method of embodiment 3 or 4, wherein the default ciphering configuration setting is non-use of ciphering for the radio bearer.
7. The method of any one of the preceding embodiments, wherein the message comprises a Radio Resource Control Connection Reconfiguration message.
8. The method of any one of the preceding embodiments, wherein checking the message for a ciphering configuration setting for the radio bearer comprises checking an Information Element inside a RadioBearerConfig Information Element.
9. The method of any one of the preceding embodiments, wherein the message configures a plurality of radio bearers for the wireless device, and wherein checking the message for a ciphering configuration setting for the radio bearer comprises checking an Information Element specific to the radio bearer.
10. The method of embodiment 9, wherein the Information Element specific to the radio bearer comprises pdcp-Config.
11. The method of embodiment 9, wherein the Information Element specific to the radio bearer comprises:
    for a data radio bearer, the DRB-ToAddMod Information Element, and
    for a signalling radio bearer, the SRB-ToAddMod Information Element.
12. The method of embodiment 9, 10 or 11, wherein checking the message for a ciphering configuration setting for the radio bearer comprises checking after the extension marker of the Information Element.
13. The method of embodiment 12, wherein the ciphering configuration setting comprises an Optional parameter, the optional parameter comprising a single bit indicating if ciphering should be enabled or disabled.
14. The method of embodiment 9, 10 or 11, wherein including a ciphering configuration setting for the radio bearer in the message comprises including the ciphering configuration setting before the extension marker of the Information Element, and wherein the ciphering configuration setting comprises an Optional Enumerated (enabled)—Need R parameter.

15. The method of embodiment 9, wherein the Information Element specific to the radio bearer comprises the SDAP-Config Information Element.

16. The method of any one of embodiments 1 to 8, wherein the message configures a plurality of radio bearers for the wireless device, and wherein checking the message for a ciphering configuration setting for the radio bearer comprises checking an Information Element applicable to all radio bearers configured by the message.

17. The method of embodiment 16, wherein the Information Element applicable to all radio bearers configured by the message comprises the SecurityConfig Information Element.

18. The method of embodiment 16 or 17, wherein checking the message for a ciphering configuration setting for the radio bearer comprises checking for a list of ciphering configuration settings for radio bearers configured by the message.

19. The method of embodiment 18, wherein the list specifies ciphering configuration settings per radio bearer identity.

20. The method of embodiment 18 or 19, when dependent on embodiment 2, wherein the list comprises only ciphering configuration settings for those bearers for which the ciphering configuration setting differs from the reference ciphering configuration setting.

21. The method of any one of embodiments 1 to 8, wherein the radio bearer is associated to a Protocol Data Unit, PDU, Session, and wherein checking the message for a ciphering configuration setting for the radio bearer comprises checking for a ciphering configuration setting for application to all radio bearers associated to that PDU Session.

22. The method of embodiment 21, wherein checking the message for a ciphering configuration setting for the radio bearer comprises checking for a list of ciphering configuration settings for PDU Sessions maintained by the wireless device.

23. The method of embodiment 22, when dependent on embodiment 2, wherein the list comprises only ciphering configuration settings for those PDU Sessions for which the ciphering configuration settings differ from the reference ciphering configuration settings.

24. The method of any one of the preceding embodiments, wherein enabling ciphering for the radio bearer in accordance with the received message comprises applying ciphering to messages transmitted on the radio bearer.

25. The method of embodiment 24, wherein applying ciphering to messages transmitted on the radio bearer comprises:
determining a ciphering algorithm for use by the wireless device;
obtaining input parameters for the ciphering algorithm;
applying the input parameters to the ciphering algorithm to generate a keystream; and
using the keystream to encrypt a message for transmission on the radio bearer.

26. The method of any of the previous embodiments, further comprising:
providing user data; and
forwarding the user data to a host computer via the transmission to the base station.

27. The method of any of the previous embodiments, further comprising:
providing control signalling; and
forwarding the control signalling to a host computer via the transmission to the base station.

Group B Embodiments

28. A method performed by a base station for configuring radio resources for use by a wireless device, the method comprising:
generating a message configuring a radio bearer for use by the wireless device;
including in the message a ciphering configuration setting enabling or disabling ciphering for the radio bearer; and
transmitting the message to the wireless device.

29. The method of embodiment 28, further comprising:
comparing the ciphering configuration setting for the radio bearer to a reference ciphering configuration setting for the radio bearer; and
including the ciphering configuration setting for the radio bearer in the generated message only if the ciphering configuration setting differs from the reference ciphering configuration setting.

30. The method of embodiment 29, wherein:
if the radio bearer configured by the message is not part of the current configuration for the wireless device, the reference ciphering configuration setting comprises a default ciphering configuration setting; and
if the radio bearer configured by the message is part of the current configuration for the wireless device, the reference ciphering configuration setting comprises the existing ciphering configuration setting for the radio bearer.

31. The method of embodiment 30, wherein the default ciphering configuration setting is specified in at least one of:
a field description;
a communication standards document.

32. The method of embodiment 30 or 31, wherein the default ciphering configuration setting is use of ciphering for the radio bearer.

33. The method of embodiment 30 or 31 wherein the default ciphering configuration setting is non-use of ciphering for the radio bearer.

34. The method of any of the previous embodiments, wherein the message comprises a Radio Resource Control, RRC, Reconfiguration message.

35. The method of any of the previous embodiments, wherein including a ciphering configuration setting for the radio bearer in the message comprises including the ciphering configuration setting in an Information Element inside a RadioBearerConfig Information Element.

36. The method of any of the previous embodiments, wherein the message configures a plurality of radio bearers for the wireless device, and wherein including a ciphering configuration setting for the radio bearer in the message comprises including the ciphering configuration setting in an Information Element specific to the radio bearer.

37. The method of embodiment 36, wherein the Information Element specific to the radio bearer comprises pdcp-Config.

38. The method of embodiment 36, wherein the Information Element specific to the radio bearer comprises:
for a data radio bearer, the DRB-ToAddMod Information Element, and
for a signalling radio bearer, the SRB-ToAddMod Information Element.
39. The method of embodiment 36, 37 or 38, wherein including a ciphering configuration setting for the radio bearer in the message comprises including the ciphering configuration setting after the extension marker of the Information Element.
40. The method of embodiment 39, wherein the ciphering configuration setting comprises an Optional parameter, the optional parameter comprising a single bit indicating if ciphering should be enabled or disabled.
41. The method of embodiment 36, 37 or 38, wherein including a ciphering configuration setting for the radio bearer in the message comprises including the ciphering configuration setting before the extension marker of the Information Element, and wherein the ciphering configuration setting comprises an Optional Enumerated (enabled)—Need R parameter.
42. The method of embodiment 36, wherein the Information Element specific to the radio bearer comprises the SDAP-Config Information Element.
43. The method of any one of embodiments 28 to 35, wherein the message configures a plurality of radio bearers for the UE, and wherein including a ciphering configuration setting for the radio bearer in the message comprises including the ciphering configuration setting in an Information Element applicable to all radio bearers configured by the message.
44. The method of embodiment 43, wherein the Information Element applicable to all radio bearers configured by the message comprises the SecurityConfig Information Element.
45. The method of embodiment 43 or 44, wherein including a ciphering configuration setting for the radio bearer in the message comprises including a list of ciphering configuration settings for radio bearers configured by the message.
46. The method of embodiment 45, wherein the list specifies ciphering configuration settings per radio bearer identity.
47. The method of embodiment 45 or 45, when dependent on embodiment 29, wherein the list comprises only ciphering configuration settings for those bearers for which the ciphering configuration setting differs from the reference ciphering configuration setting.
48. The method of any one of embodiments 28 to 35, wherein the radio bearer is associated to a Protocol Data Unit, PDU, Session, and wherein including a ciphering configuration setting for the radio bearer in the message comprises including a ciphering configuration setting for application to all radio bearers associated to that PDU Session.
49. The method of embodiment 48, wherein including a ciphering configuration setting for the radio bearer in the message comprises including a list of ciphering configuration settings for PDU Sessions maintained by the wireless device.
50. The method of embodiment 49, when dependent on embodiment 29, wherein the list comprises only ciphering configuration settings for those PDU Sessions for which the ciphering configuration settings differ from the reference ciphering configuration settings.
51. The method of any one of the preceding embodiments, wherein, if the ciphering configuration setting for the radio enables ciphering for the radio bearer, the method further comprises applying ciphering to messages transmitted to the wireless device on the radio bearer.
52. The method of embodiment 51, wherein applying ciphering to messages transmitted to the wireless device on the radio bearer comprises:
determining a ciphering algorithm for use with the wireless device;
obtaining input parameters for the ciphering algorithm;
applying the input parameters to the ciphering algorithm to generate a keystream; and
using the keystream to encrypt a message for transmission to the wireless device on the radio bearer.
53. The method of any of the previous embodiments, further comprising:
obtaining user data; and
forwarding the user data to a host computer or a wireless device.
54. The method of any of the previous embodiments, further comprising:
obtaining control signalling; and
forwarding the control signalling to a host computer or a wireless device.

Group C Embodiments

55. A wireless device for managing radio resources in the wireless device, the wireless device comprising:
processing circuitry configured to perform any of the steps of any of the Group A embodiments; and
power supply circuitry configured to supply power to the wireless device.
56. A base station for configuring radio resources for use by a wireless device, the base station comprising:
processing circuitry configured to perform any of the steps of any of the Group B embodiments;
power supply circuitry configured to supply power to the base station.
57. A user equipment (UE) for managing radio resources in the wireless device, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group a Embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
58. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
59. The communication system of the previous embodiment further including the base station.
60. The communication system of the previous 2 embodiments, further including the UE, wherein the UE is configured to communicate with the base station.
61. The communication system of the previous 3 embodiments, wherein:
the processing circuitry of the host computer is configured to execute a host application, thereby providing the user data; and
the UE comprises processing circuitry configured to execute a client application associated with the host application.
62. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
63. The method of the previous embodiment, further comprising, at the base station, transmitting the user data.
64. The method of the previous 2 embodiments, wherein the user data is provided at the host computer by executing a host application, the method further comprising, at the UE, executing a client application associated with the host application.
65. A user equipment (UE) configured to communicate with a base station, the UE comprising a radio interface and processing circuitry configured to perform the of the previous 3 embodiments.
66. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
67. The communication system of the previous embodiment, wherein the cellular network further includes a base station configured to communicate with the UE.
68. The communication system of the previous 2 embodiments, wherein:
the processing circuitry of the host computer is configured to execute a host application, thereby providing the user data; and
the UE's processing circuitry is configured to execute a client application associated with the host application.
69. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
70. The method of the previous embodiment, further comprising at the UE, receiving the user data from the base station.
71. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
72. The communication system of the previous embodiment, further including the UE.
73. The communication system of the previous 2 embodiments, further including the base station, wherein the base station comprises a radio interface configured to communicate with the UE and a communication interface configured to forward to the host computer the user data carried by a transmission from the UE to the base station.
74. The communication system of the previous 3 embodiments, wherein:
the processing circuitry of the host computer is configured to execute a host application; and
the UE's processing circuitry is configured to execute a client application associated with the host application, thereby providing the user data.
75. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
76. A method implemented in a communication system including a host computer, a base station and a user equipment (UE), the method comprising:
at the host computer, receiving user data transmitted to the base station from the UE, wherein the UE performs any of the steps of any of the Group A embodiments.
77. The method of the previous embodiment, further comprising, at the UE, providing the user data to the base station.
78. The method of the previous 2 embodiments, further comprising:
at the UE, executing a client application, thereby providing the user data to be transmitted; and
at the host computer, executing a host application associated with the client application.
79. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
80. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

81. The communication system of the previous embodiment further including the base station.

82. The communication system of the previous 2 embodiments, further including the UE, wherein the UE is configured to communicate with the base station.

83. The communication system of the previous 3 embodiments, wherein:
the processing circuitry of the host computer is configured to execute a host application;
the UE is configured to execute a client application associated with the host application, thereby providing the user data to be received by the host computer.

84. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

85. The method of the previous embodiment, further comprising at the base station, receiving the user data from the UE.

86. The method of the previous 2 embodiments, further comprising at the base station, initiating a transmission of the received user data to the host computer.

What is claimed is:

1. A method performed by a wireless device for managing radio resources in the wireless device, the method comprising the wireless device:
receiving a message configuring at least one radio bearer for use by the wireless device, wherein the message includes a bearer-specific pdcp-Config Information Element for the at least one radio bearer;
checking the bearer-specific pdcp-Config Information Element associated with the radio bearer for a ciphering configuration setting enabling or disabling ciphering for the radio bearer, wherein the ciphering configuration is located after an extension marker of the bearer-specific pdcp-Config Information Element; and
performing at least one of enabling or disabling ciphering for the radio bearer in accordance with the received message.

2. The method of claim 1, wherein performing at least one of enabling or disabling ciphering for the radio bearer in accordance with the received message comprises:
if the message includes a ciphering configuration setting for the radio bearer, performing at least one of enabling or disabling ciphering for the radio bearer in accordance with the ciphering configuration setting included in the message; and
if the message does not include a ciphering configuration setting for the radio bearer, performing at least one of enabling or disabling ciphering for the radio bearer in accordance with a reference ciphering configuration setting for the radio bearer.

3. The method of claim 2, wherein:
if the radio bearer configured by the message is not part of the current configuration for the wireless device, the reference ciphering configuration setting comprises a default ciphering configuration setting; and
if the radio bearer configured by the message is part of the current configuration for the wireless device, the reference ciphering configuration setting comprises the existing ciphering configuration setting for the radio bearer.

4. The method of claim 1, wherein the message comprises a Radio Resource Control Connection Reconfiguration message or a Radio Resource Control Reconfiguration message.

5. The method of claim 1, wherein checking the message for a ciphering configuration setting for the radio bearer comprises checking an Information Element inside a RadioBearerConfig Information Element.

6. The method of claim 1, wherein the ciphering configuration setting comprises an Optional parameter, the optional parameter comprising a single bit indicating if ciphering is to be enabled or disabled.

7. The method of claim 1, wherein the radio bearer is associated to a Protocol Data Unit, PDU, Session, and wherein checking the message for a ciphering configuration setting for the radio bearer comprises checking for a ciphering configuration setting for application to all radio bearers associated to that PDU Session.

8. A method performed by a base station for configuring radio resources for use by a wireless device, the method comprising:
generating a message configuring at least one radio bearer for use by the wireless device (1502), wherein the message includes a bearer-specific pdcp-Config Information Element for the at least one radio bearer;
including in the message a ciphering configuration setting enabling or disabling ciphering for the radio bearer (1504), wherein the ciphering configuration is located after an extension marker of the bearer-specific pdcp-Config Information Element; and
transmitting the message to the wireless device (1506).

9. The method of claim 8, further comprising:
comparing the ciphering configuration setting for the radio bearer to a reference ciphering configuration setting for the radio bearer; and
including the ciphering configuration setting for the radio bearer in the generated message only if the ciphering configuration setting differs from the reference ciphering configuration setting.

10. The method of claim 9, wherein:
if the radio bearer configured by the message is not part of the current configuration for the wireless device, the reference ciphering configuration setting comprises a default ciphering configuration setting; and
if the radio bearer configured by the message is part of the current configuration for the wireless device, the reference ciphering configuration setting comprises the existing ciphering configuration setting for the radio bearer.

11. The method of claim 8, wherein the message comprises a Radio Resource Control, RRC, Reconfiguration message.

12. The method of claim 8, wherein including a ciphering configuration setting for the radio bearer in the message comprises including the ciphering configuration setting in an Information Element inside a RadioBearerConfig Information Element.

13. The method of claim 8, wherein the ciphering configuration setting comprises an Optional parameter, the optional parameter comprising a single bit indicating if ciphering should be enabled or disabled.

14. The method of claim 8, wherein the radio bearer is associated to a Protocol Data Unit, PDU, Session, and wherein including a ciphering configuration setting for the radio bearer in the message comprises including a ciphering configuration setting for application to all radio bearers associated to that PDU Session.

15. A wireless device for managing radio resources in the wireless device, the wireless device comprising:
   processing circuitry; and
   power supply circuitry configured to supply power to the wireless device; wherein the processing circuitry is configured to:
      receiving a message configuring at least one radio bearer for use by the wireless device, wherein the message includes a bearer-specific pdcp-Config Information Element for the at least one radio bearer;
      check the bearer-specific pdcp-Config Information Element associated with the radio bearer for a ciphering configuration setting enabling or disabling ciphering for the radio bearer, wherein the ciphering configuration is located after an extension marker of the bearer-specific pdcp-Config Information Element; and
      perform at least one of enabling or disabling ciphering for the radio bearer in accordance with the received message.

16. A base station for configuring radio resources for use by a wireless device, the base station comprising:
   processing circuitry;
   power supply circuitry configured to supply power to the base station; wherein the processing circuitry is configured to:
      generate a message configuring at least one radio bearer for use by the wireless device, wherein the message includes a bearer-specific pdcp-Config Information Element for the at least one radio bearer;
      include in the message a ciphering configuration setting enabling or disabling ciphering for the radio bearer, wherein the ciphering configuration is located after an extension marker of the bearer-specific pdcp-Config Information Element; and
      transmit the message to the wireless device.

* * * * *

UNITED STATES PATENT AND TRADEMARK OFFICE
CERTIFICATE OF CORRECTION

| | |
|---|---|
| PATENT NO. | : 11,968,524 B2 |
| APPLICATION NO. | : 17/688692 |
| DATED | : April 23, 2024 |
| INVENTOR(S) | : Rugeland et al. |

It is certified that error appears in the above-identified patent and that said Letters Patent is hereby corrected as shown below:

On the Title Page

On Page 2, in Item (56), under "OTHER PUBLICATIONS", in Column 2, Line 12, delete "TSG:TS33.501," and insert -- TSG: TS33.501, --, therefor.

In the Drawings

In Fig. 5, Sheet 5 of 16, for Tag "501", Line 1, delete "Processor" and insert -- Processing Circuitry --, therefor.

In the Specification

In Column 1, Line 7, delete "2019," and insert -- 2019, now U.S. Pat. No. 11,272,359, --, therefor.

In Column 2, Line 43, delete "There currently exist certain challenge(s). There is" and insert the same on Line 42, after "DRB.", as a continuation paragraph.

In Column 7, Line 2, delete "messages:" and insert -- messages; --, therefor.

In Column 10, Line 41, delete "nay" and insert -- may --, therefor.

In Columns 11 & 12, in Table "5.3.5.6.5 DRB Addition/Modification", Line 6, delete "pdcp-Con fig;" and insert -- pdcp-Config; --, therefor.

In Columns 11 & 12, in Table "5.3.5.6.5 DRB Addition/Modification", Line 10, delete "enabled" and insert -- enabled; --, therefor.

In Columns 11 & 12, in Table "5.3.5.6.5 DRB Addition/Modification", Line 25, delete "algorithms" and insert -- algorithms; --, therefor.

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 11,968,524 B2

In Columns 11 & 12, in Table "5.3.5.6.5 DRB Addition/Modification", Line 29, delete "BearerIdentity" and insert -- BearerIdentity; --, therefor.

In Columns 15 & 16, in Table, Line 1, delete "(l..maxDRB))" and insert -- (1..maxDRB)) --, therefor.

In Column 16, Line 14, delete ""apheringDisabled"," and insert -- "cipheringDisabled", --, therefor.

In Columns 17 & 18, in Table, Line 4, delete "ENUMERATED{keNB, s-KgNB)" and insert -- ENUMERATED{keNB, s-KgNB} --, therefor.

In Column 18, Lines 47-48, delete "RRCReconfiguation" and insert -- RRCReconfiguration --, therefor.

In Columns 17 & 18, in Table "RRCReconfiguration Message", Line 4, delete "RRC-TransaetionIdentifier," and insert -- RRC-TransactionIdentifier, --, therefor.

In Column 20, Line 58, delete "(WiMax)," and insert -- (WiMAX), --, therefor.

In Column 22, Line 51, delete "(SOC)." and insert -- (SoC). --, therefor.

In Column 24, Line 7, delete "1492" and insert -- 492 --, therefor.

In Column 25, Line 22, delete "device e A" and insert -- device. A --, therefor.

In Column 25, Line 26, delete "(V21)," and insert -- (V2I), --, therefor.

In Column 25, Line 36, delete "narrow band internet of things" and insert -- Narrowband Internet of Things --, therefor.

In Column 26, Line 8, delete "1412" and insert -- 412 --, therefor.

In Column 26, Line 50, delete "SOC." and insert -- SoC. --, therefor.

In Column 28, Line 53, delete "5200" and insert -- 500 --, therefor.

In Column 30, Line 66, delete "WiMax," and insert -- WiMAX, --, therefor.

In Column 35, Line 41, delete "which it" and insert -- which --, therefor.

In Column 37, Line 24, delete "embodiments" and insert -- embodiments. --, therefor.

In Column 44, Line 50, delete "a Embodiments;" and insert -- A embodiments; --, therefor.